US012186262B2

(12) United States Patent
Koth

(10) Patent No.: US 12,186,262 B2
(45) Date of Patent: Jan. 7, 2025

(54) PRESSURE RELEASE AND MASSAGE TOOL

(71) Applicant: Aletha Inc., Walnut Creek, CA (US)

(72) Inventor: Christine Annette Koth, Walnut Creek, CA (US)

(73) Assignee: Aletha Inc., Walnut Creek, CA (US)

( * ) Notice: Subject to any disclaimer, the term of this patent is extended or adjusted under 35 U.S.C. 154(b) by 0 days.

(21) Appl. No.: 17/646,469

(22) Filed: Dec. 29, 2021

(65) Prior Publication Data

US 2022/0117834 A1 Apr. 21, 2022

Related U.S. Application Data

(63) Continuation of application No. 16/850,801, filed on Apr. 16, 2020.

(60) Provisional application No. 62/860,222, filed on Jun. 11, 2019.

(51) Int. Cl.
*A61H 7/00* (2006.01)

(52) U.S. Cl.
CPC ..... *A61H 7/007* (2013.01); *A61H 2201/0153* (2013.01); *A61H 2201/1284* (2013.01)

(58) Field of Classification Search
CPC ........ A61H 7/001; A61H 7/003; A61H 7/007; A61H 2201/013; A61H 2201/0107; A61H 2201/0153; A61H 2201/0126; A61H 2201/0192; A61H 2201/1253; A61H 2201/1284; A61H 2201/1635; A61H 2201/168; A61H 2201/0092; A61H 2205/085; A61H 2203/0406; A61H 1/006; A61H 1/008; A61H 1/3904; A61H 1/39
See application file for complete search history.

(56) References Cited

U.S. PATENT DOCUMENTS

| | | | | |
|---|---|---|---|---|
| 5,848,980 | A | 12/1998 | Demerais | |
| 6,821,260 | B2 | 11/2004 | Fors | |
| 8,808,208 | B2 | 8/2014 | Mouatt | |
| 11,246,791 | B2 * | 2/2022 | Koth | A61H 7/003 |
| 2013/0066245 | A1 | 3/2013 | Dagan | |

(Continued)

FOREIGN PATENT DOCUMENTS

| | | | | |
|---|---|---|---|---|
| DE | 202018102512 | U1 * | 7/2018 | A61H 7/001 |
| EP | 3488840 | A1 | 5/2019 | |

(Continued)

OTHER PUBLICATIONS

English translation for DE-202018102512-U1 (Jul. 2018). Accesed on Apr. 2023. (2023).*
English Machine Translation of KR-200279986-Y1 (2002), Accessed Nov. 2, 2023. (Year: 2023).*
International Application Serial No. PCT/US20/37089, Preliminary Report on Patentability mailed Dec. 23, 2021, 6 pgs.

(Continued)

*Primary Examiner* — Kendra D Carter
*Assistant Examiner* — Maap Ahmed Ellabib
(74) *Attorney, Agent, or Firm* — ArentFox Schiff LLP

(57) ABSTRACT

Device and method for relieving muscle tension. The device includes a tip portion with a first three dimensional geometry, an extension portion with a second three dimensional geometry, and a base portion with a third three dimensional geometry. The device is configured such that a user can attain trigger point release on a muscle or muscle group by positioning the device on a fixed surface, positioning the tip portion of the device to be in contact with the muscle or muscle group, and then selectively applying pressure to the muscle or muscle group using the weight of the user and contact forces.

17 Claims, 23 Drawing Sheets

(56) References Cited

U.S. PATENT DOCUMENTS

| | | | |
|---|---|---|---|
| 2016/0296415 | A1 | 10/2016 | Cross |
| 2016/0317387 | A1 | 11/2016 | Cox et al. |
| 2020/0390639 | A1 | 12/2020 | Koth |
| 2021/0283003 | A1 | 9/2021 | Koth |
| 2022/0117832 | A1 | 4/2022 | Koth |

FOREIGN PATENT DOCUMENTS

| | | | | |
|---|---|---|---|---|
| EP | 3982903 | | | 4/2022 |
| JP | H0663033 | A | | 3/1994 |
| KR | 200279986 | Y1 | * | 7/2002 |
| RU | 2384319 | C2 | | 3/2010 |
| WO | 2020252089 | A1 | | 12/2020 |

OTHER PUBLICATIONS

International Application Serial No. PCT/US20/37089, Search Report and Written Opinion mailed Sep. 3, 207 pgs.

U.S. Appl. No. 16/850,801, USPTO e-Office Action: CTAV—Advisory Action (Ptol-303), Feb. 26, 2024, 3 pages.

U.S. Appl. No. 16/850,801, USPTO e-Office Action: CTFR—Final Rejection, Oct. 31, 2023, 15 pages.

U.S. Appl. No. 16/850,801, USPTO e-Office Action: CTNF—Non-Final Rejection, May 9, 2023, 13 pages.

U.S. Appl. No. 16/850,801, USPTO e-Office Action: Restriction Requirement, mailed Feb. 9, 2023, 6 pages.

Supplemental European Search Report, Application No. EP 20823025, dated Jun. 26, 2023, 12 pages.

* cited by examiner

PRESSURE RELEASE AND MASSAGE TOOL

CROSS-REFERENCE TO RELATED APPLICATIONS

The present application is a continuation of U.S. patent application Ser. No. 16/850,801 filed on Apr. 16, 2020, and entitled PRESSURE RELEASE AND MASSAGE TOOL, which claims the benefit of priority under 35 U.S.C. § 119(e) to U.S. Provisional Application No. 62/860,222, titled "ILIACUS MUSCLE PRESSURE RELEASE AND MASSAGE TOOL," filed Jun. 11, 2019, all of which are incorporated herein by reference in their entirety.

TECHNICAL FIELD

Aspects of the present disclosure relate generally to massage or physical therapy devices, and more particularly apparatuses and methods for trigger point release of muscle groups.

BACKGROUND

Muscles directly relate to the function of body parts. Therefore tension in the muscles significantly contributes to dysfunction or pain in any areas correlated with the muscles. For example, tightness and excess tension in the iliacus muscle are directly related to the function of the psoas, hip, lower back, pelvis, and leg. By releasing the tension in muscles, such as the iliacus muscle, correlated body parts, such as the hips, can function better and pain can be resolved.

Because muscles can sometimes be hard to access, pain and discomfort have traditionally been addressed by only a handful of skilled practitioners, who use their fingers to put prolonged pressure on the affected muscles to get the muscles to relax. Because of the difficulty in accessing these muscles independently without a practitioner, and the inability for a person to apply sufficient pressure on these muscles independently, it is very difficult for an individual to accomplish relief in these areas without the help of another person. People have tried to use many different kinds of objects in attempts to relieve pain and discomfort in affected muscles with only mediocre effectiveness. Thus, there is a need for an effective way to provide self-applied relief of muscle pain and discomfort.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a massage or selective pressure application device. The device comprises a tip portion having a first three dimensional geometry. The device also includes an extension portion coupled to the tip portion. The extension portion has a second three dimensional geometry. The second three dimensional geometry includes a length and varying cross-sectional diameter along the length of the of the extension portion. The cross-sectional diameters of some extension portion sections proximate to the tip portion are smaller than the cross-sectional diameters of some extension portion sections distal to the tip portion. The device also includes a base portion coupled to the extension portion at a distal end to the tip portion. The base portion has a third three dimensional geometry. The base portion is configured to be planted on a surface or ground such that a user can apply an upward force to a muscle via the tip portion while the base portion is planted on the surface or ground.

Another aspect of the disclosure relates to a method of using a selective pressure application device to relieve muscle tension. The method comprises positioning the selective pressure application device on a surface or ground and then leaning on the selective pressure application device such that a muscle or muscle group can attain trigger point release. The selective pressure application device comprises a tip portion having a first three dimensional geometry. The device also includes an extension portion coupled to the tip portion. The extension portion has a second three dimensional geometry. The second three dimensional geometry includes a length and varying cross-sectional diameter along the length of the of the extension portion. The cross-sectional diameters of some extension portion sections proximate to the tip portion are smaller than the cross-sectional diameters of some extension portion sections distal to the tip portion. The device also includes a base portion coupled to the extension portion at a distal end to the tip portion. The base portion has a third three dimensional geometry. The base portion is configured to be planted on a surface or ground such that a user can apply an upward force to a muscle via the tip portion while the base portion is planted on the surface or ground.

In some embodiments, the base portion includes a pivot configured to allow the extension portion to rotate about the pivot such that the upward force can be applied at various angles and in various directions. In some embodiments, the third three dimensional geometry includes a cylindrical shape. In some embodiments, the base portion includes a weight to stabilize the device when a downward force is applied to the device. In some embodiments, the weight includes a flat rectangular surface to further stabilize the device via friction. In some embodiments, the selective application device further comprises a handle portion connected to the base portion via a lever arm. In some embodiments, the handle portion is configured to allow the user to push down on the handle portion in order to maneuver the tip portion into various directions or angles. In some embodiments, the tip portion is curved. In some embodiments, the extension portion is curved. In some embodiments, the extension portion is curved on both sides in opposite directions.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular embodiments of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

DETAILED DESCRIPTION

Reference will now be made in detail to some specific examples of the present disclosure including the best modes contemplated for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular interlocking parts or physical compositions. However, it should be noted that the techniques of the present disclosure apply to various other parts or compositions. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

As used herein, the term “tip” will be used interchangeably with “pointed geometry.” As used herein, the term “tool” will be used interchangeably with “device.” As used herein, the term “massage,” is used interchangeably with “trigger point release.”

Various techniques and mechanisms of the present disclosure will sometimes be described in singular form for clarity. However, it should be noted that some embodiments include multiple iterations of a technique or multiple instantiations of a mechanism unless noted otherwise. For example, a device has a tip in a variety of contexts. However, it will be appreciated that a device can have multiple different tips while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a tip may be connected to a base, but it will be appreciated that a variety of extension portions, arms, connectors, bridges, and other features or elements may reside between the tip and the base. Consequently, a connection does not necessarily mean a direct, unimpeded connection unless otherwise noted.

Figures 1A, 1B:
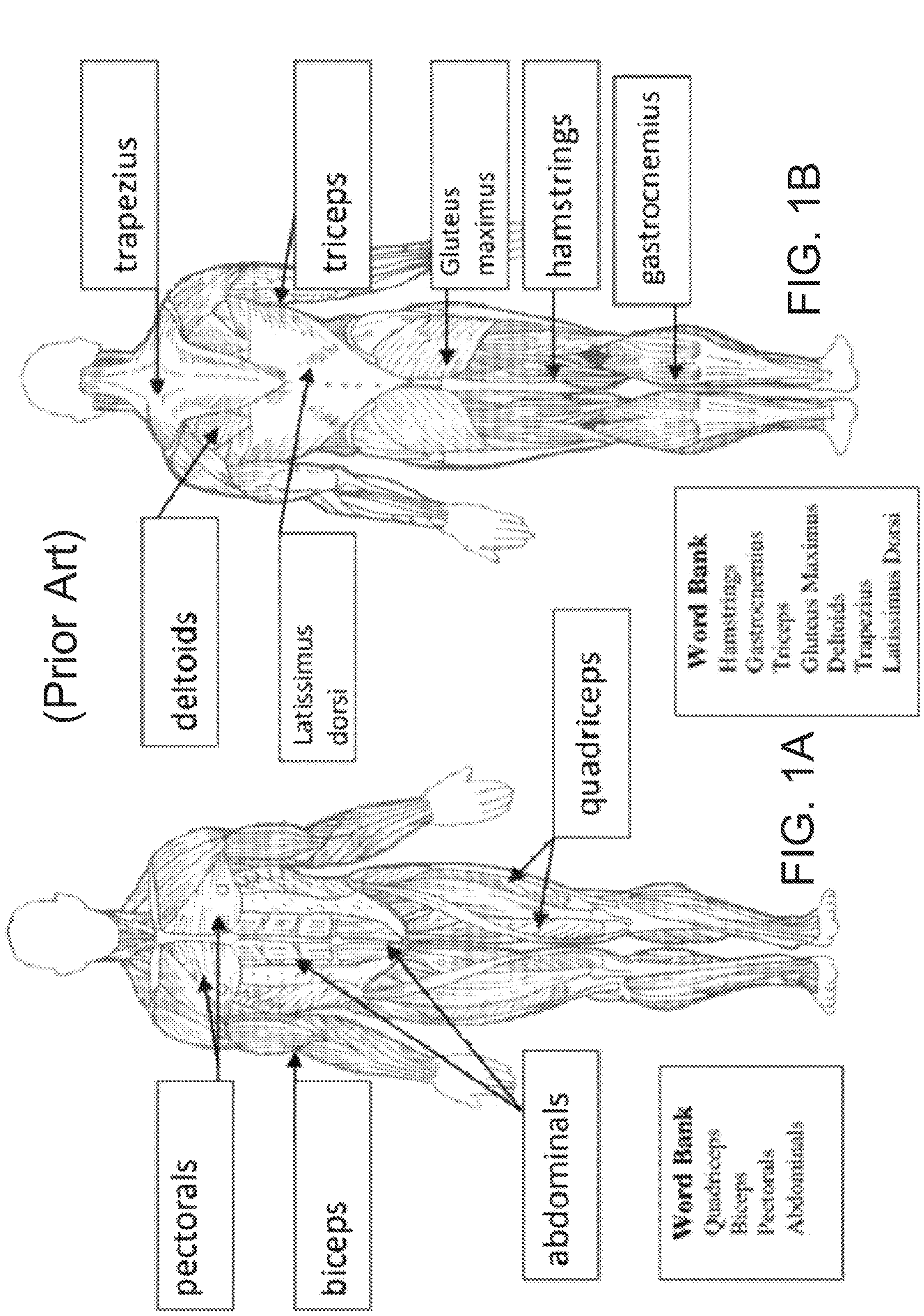
FIGS. 1A-1B show front and back illustrations of an example muscular system, in accordance with embodiments of the present disclosure.

Aspects of the disclosure relate to a massage device usable to stimulate or apply compression to, for example, a portion of muscles or muscle groups. FIGS. 1A-1B show front and back illustrations of a simplified muscular system, in accordance with embodiments of the present disclosure. FIGS. 1A-1B simply show some example muscle groups that can be affected by pressure, pain, and/or discomfort, to which techniques and devices disclosed herein aim to alleviate. For example, the techniques and devices disclosed herein can be used to alleviate pressure or pain in the gluteus maximus, pectorals, quadriceps, and hamstrings. The images in FIGS. 1A-1B are common knowledge, are provided for reference purposes only, and can be found on the Internet, for example at:

https://www.cabarrus.k12.nc.us/site/handlers/filedownload.ashx?moduleinstanceid=68833&dataid=265555&FileName=Muscles%20-%20Workbook.pdf.

One example muscle or muscle group which often suffers from pressure is the iliacus muscle. The iliacus muscle is one of the composite muscles that make up the iliopsoas muscle group. The iliopsoas muscle originates from the lumbar vertebrae and discs and then inserts though the femur, and any structure from the lumbar spine to the femur may be affected directly by the iliopsoas muscle group and more specifically the iliacus muscle. Further, various major nerves, such as the femoral nerve and the obturator nerve, also pass through the iliopsoas muscle group and/or the iliacus muscle. Accordingly, any of these innervated structures may be affected by the iliacus muscle. For example, tightness of the iliacus muscle may cause chronic or recurrent pain in any one of the lower abdomen, groin, buttocks, legs, hip joint, sacroiliac joint, lower back, iliac crest, and/or many other regions of the body.

As with many muscles, the iliacus muscle may tighten or shorten due to various external and/or internal factors. As with many muscles, massaging and/or providing localized pressure to or "releasing" the iliacus muscle may help to relax or loosen the muscle and/or reduce pain associated with tightness and/or shortening of the muscle. However, because the iliacus arises from the medial side of the femur bone and also from the inner surface of the ilium bone of the pelvis, portions of the muscle may be difficult to access by a therapist and/or physician. Further, the affected individual may wish to be able to compress and/or massage their own iliacus muscle(s) without the need for assistance from others.

Figure 2A:
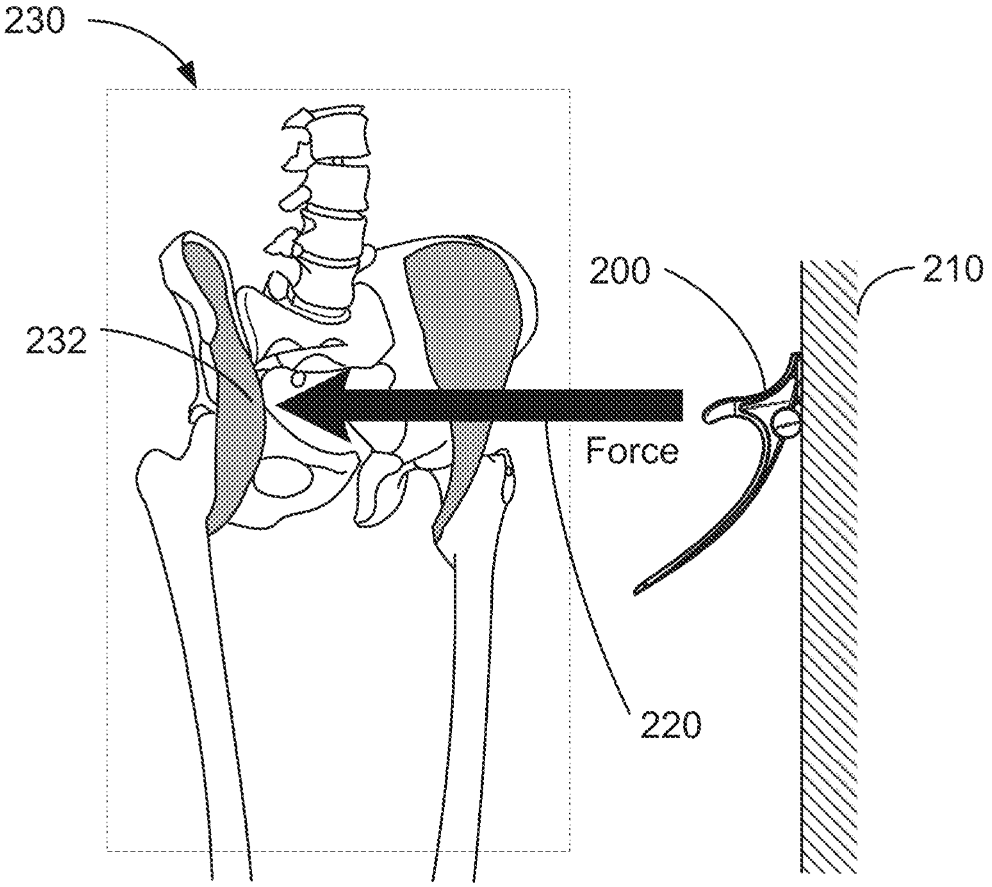
FIGS. 2A-2C are diagrams illustrating one example of how a device can alleviate pressure or pain in the iliacus muscle, in accordance with embodiments of the present disclosure.
Figure 2B:
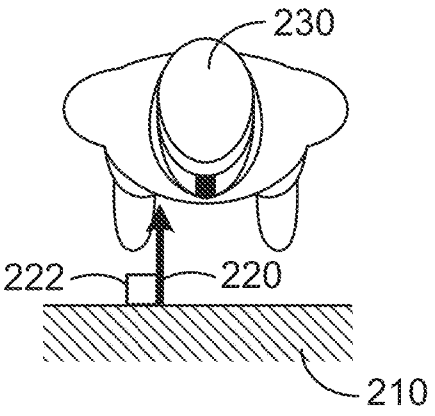
Figure 2C:
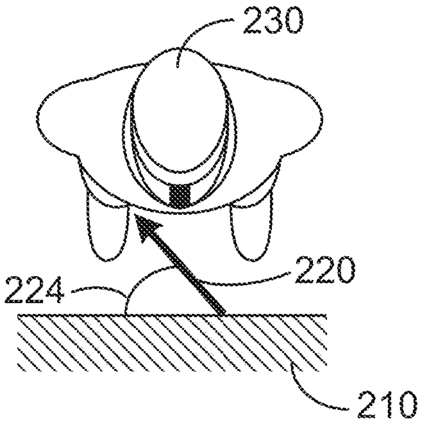

With the aforementioned benefits in mind, aspects of the disclosure relate to a massage device usable to provide localized pressure to the iliacus muscle. FIGS. 2A-2C are diagrams illustrating one example of how a device can alleviate pressure or pain in the iliacus muscle, in accordance with embodiments of the present disclosure. Example aspects of the massage device in accordance with aspects of the present disclosure are described throughout the specification. In the interest of clarity, not all possible features of an actual implementation are described in this specification. It will of course be appreciated that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

FIG. 2A shows a device 200 applying force 220 to an iliacus muscle 232 of person 230. In FIG. 2A, force 220 is first applied perpendicular to both the ground 210 and iliacus muscle 232. This is because often times, the iliacus muscle requires directed pressure to get relief. Thus, to be most effective, pointed pressure must be applied normal to the face of the iliacus. FIG. 2B illustrates that a normal force with a perpendicular angle 222 to ground 210 is applied to the iliacus muscle in order to provide relief. In some embodiments, for optimal relief, pressure needs to be applied normal to the face of the iliacus. However, due to the curved nature of the pelvic bone, a force must be applied at an inward angle 224 in the pelvic area, as illustrated in FIG. 2C.

Often times, applying this normal force at an inward angle requires the assistance of someone else, e.g., a therapist. However, in cases where assistance is not available, a tool 200 is necessary to self-administer this pressure. In some embodiments, to self-administer this pressure, the user may have to use his/her own body weight to apply the high forces necessary for effective therapy, as shown in FIGS. 2B and 2C. In some embodiments, it is often difficult to self-administer the pressure in the proper location and direction simply by lying directly on a static pointed object, at an angle similar to angle 222 shown in FIG. 2B.

Consequently, to effectively self-administer the pressure to the iliacus muscle, movement is needed. Thus, in some embodiments, to achieve a high force in the proper angle, the tip of device 200 and user 230 have to move relative to each other after user 230 applies his/her body weight onto device 200. In some embodiments, device 200 is a pointed object that translates through space into the body after user 230 lies on it. In other embodiments, device 200 remains static but allows user 230 to shift relative to the pointed tip of device 200 once user 230 lies on device 200. Because a static device that allows the user to shift requires more effort on the part of the user, it may be preferable to some users to have a pointed object that translates through space. In some embodiments, a combination of both options can also be effective for some users.

Although FIGS. 2A-2C illustrate a device 200 being applied to iliacus muscle 232, device 200 can be applied to an muscle group that feels pressure, tension, or pain, and can benefit from self-administered trigger point release. As previously mentioned, there can be many variations to the structure of device 200. Some of the variations are described in detail with reference to the remaining figures. However, while the remaining figures illustrate some variations or implementations, they do not represent an exhaustive set of configurations for a device in accordance with the techniques and mechanisms disclosed herein. For example, different elements of different figures can be combined in ways not described in this disclosure and still fulfill goal of self-administering trigger point release to muscles or muscle groups. In addition, partially or entirely new configurations not mentioned can also fall under the scope of the present disclosure as long as the goals of effective self-administered trigger point release are met. Various embodiments are described in detail below.

Figure 3A:
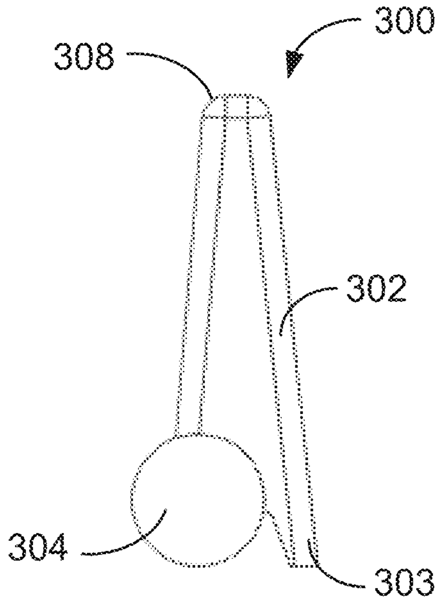
FIGS. 3A-3B illustrate a two dimensional view of an example massage device, in accordance with one or more embodiments of the present disclosure.
Figure 3B:
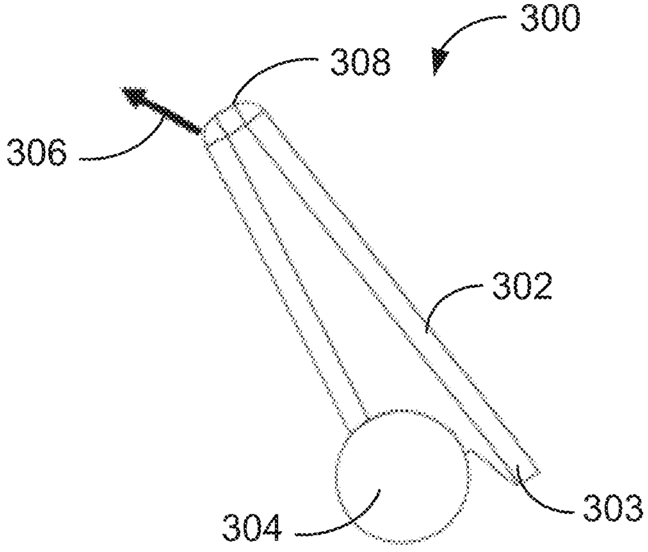

FIGS. 3A-3B illustrate a two dimensional view of a simple example massage device, in accordance with one or more embodiments of the present disclosure. FIGS. 3A-3B illustrate a simple example of a pointed object, or device, 300 translating through space. Pointed object 300 includes pointed geometry, or tip, 308, a rotatable extended portion 302 coupled to tip 308, and a pivot 304 at the base of extended portion 302. In some embodiments, extender 302 is wider at the base than at the tip. In some embodiments, extended portion 302 connects pointed geometry 308 and pivot 304 together in a triangular fashion (from just a one-sided view), similar to an isosceles triangle, with pointed geometry 308 at the top of the triangle, pivot 304 being one of the bases of the triangle, and a standing leg 303 extending from extended portion 302 at the other base of the triangle. In some embodiments, in addition, to translating through space into the body, force also needs to be applied along the correct vector 306. One way to get the device to translate through space and apply force along the correct vector is by having pointed object 300 rotate about pivot 304.

One method for using pointed object 300 is described below. First, device 300 is placed on a fixed surface, such as the ground, as illustrated in FIG. 3A. Next, the user lies on top of device 300, with the pointed geometry, or tip, 308 contacting the body of the user a muscle, such as the iliacus muscle, in a manner similar to what is shown in FIG. 2B. Then, by rotating pointed geometry 308 into the muscle as the user applies body weight on top, a high force 306 can be applied in the proper angle against the muscle. FIG. 3B shows how tip 308 can be moved and angled properly via rotation of extended portion 302 around pivot 304.

Figure 4:
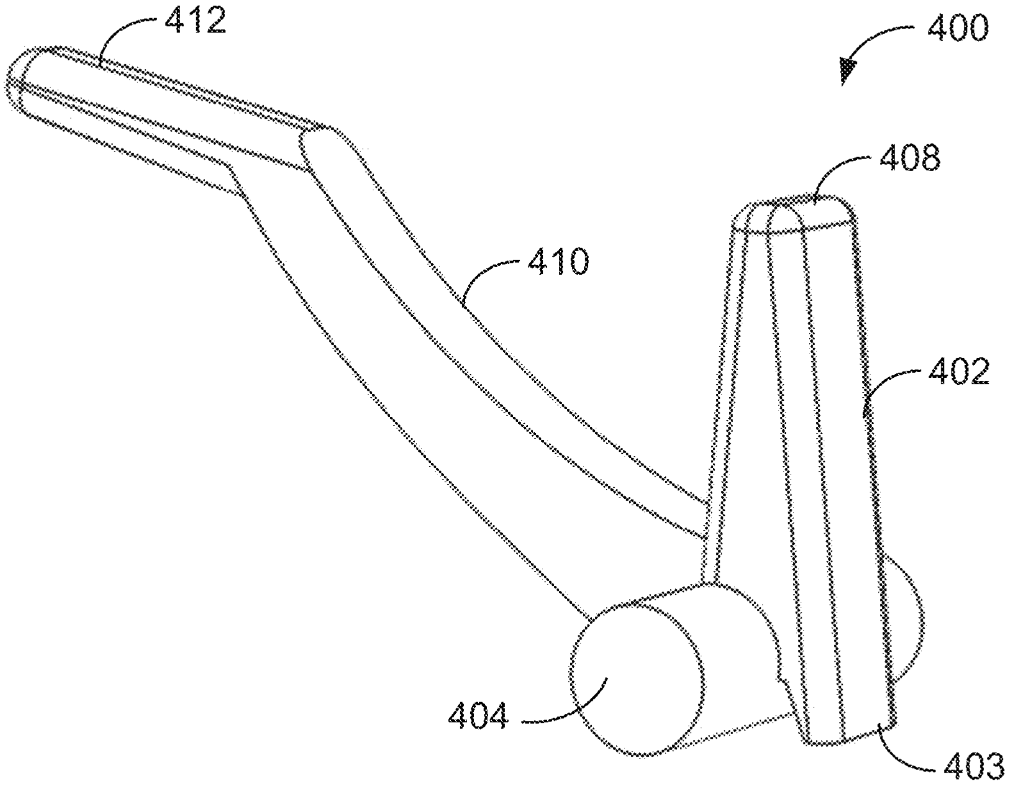
FIG. 4 shows a three dimensional view of an example massage device with a handle, in accordance with one or more embodiments of the present disclosure.

FIGS. 3A-3B show a simple massage device, in accordance with embodiments of the present disclosure. FIG. 4 illustrates a more complicated device. FIG. 4 shows a three dimensional view of an example massage device with a handle, in accordance with one or more embodiments of the present disclosure. FIG. 4 illustrates essentially the same device as in FIG. 3A, but with an added lever arm 410 and handle 412. In some embodiments, lever arm 410 and handle 412 are added to help give the user leverage for creating the rotation of the pointed geometry 408. During usage, when lying on pointed geometry 408, the user can push handle 412 downward to force extended portion 402 of device 400 to rotate about pivot 404, thereby forcing tip 408 into his/her muscle and apply pressure in the intended location and angle.

As exemplified in FIG. 4, lever arm 410 is connected to pivot 404 on the surface of pivot 404 on the opposite side of the standing leg 403. The lever arm extends laterally and vertically at an angle from the ground, ending in the handle. In some embodiments, the handle is connected to the lever arm at a separate angle from the angle formed from the lever arm and the ground. In some embodiments, the handle is specifically shaped in an ergonomic grip for a user's hand. It is worth noting that the pivot displayed in FIG. 4 demonstrates the cylindrical nature of the pivot in FIGS. 3A and 3B, which was not shown due to a two dimensional perspective. However, in some embodiments, the pivot need not be a cylinder, but rather any three-dimensional shape that allows for at least partial rotation about the pivot.

Figure 5:
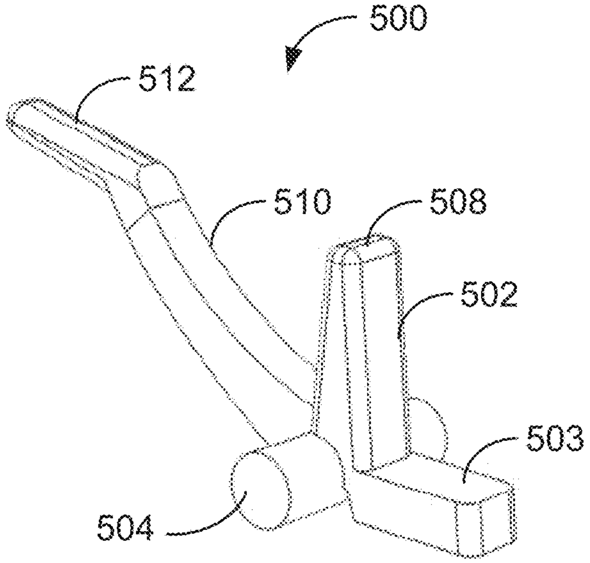
FIG. 5 shows an example device with a handle and a weight, in accordance with embodiments of the present disclosure.

FIG. 5 illustrates a modification to FIG. 4. FIG. 5 shows an example device 500 with a handle 512 and a weight 503, in accordance with embodiments of the present disclosure. In FIG. 5, weight 503 can be added to the front side of device 500 to prevent it from rotating toward the handle when in a resting position. In this example, "front side" refers to the side where the standing leg would have been, opposite of lever handle 512. Weight 503 serves as a counterbalance to lever handle 512 and lever arm 510. The remaining portions of device 500, e.g., pointed geometry 508, extended portion 502, pivot 504, are the same as the analogous features in FIG. 4.

In some embodiments, the weight of handle 512 and lever arm 510 needs to be at most 40% of the weight of device 500. In addition, handle 512 and lever arm 510 would ideally be made of strong enough material to withstand the downward force or pressure (material: metal, polycarbonate, etc.) exerted on it by the user.

In some embodiments, the length cannot be much shorter than about 9 inches for certain muscle groups, such as the iliacus, in order to provide enough room for a person to grab and press down. However, different lengths are required for different muscle groups.

In some embodiments, lever arm 510 needs to be positioned at a large enough angle to give sufficient room to push down such that the tip rotates the differential distance between the tip in neutral and the surface of the bone that needs to pin the muscle against.

Figure 6:
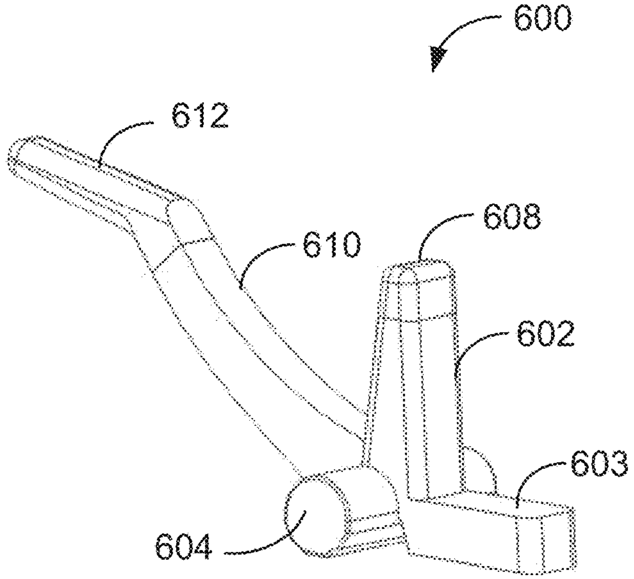
FIG. 6 shows an example device with a polygonal prism shaped pivot, in accordance with embodiments of the present disclosure.
Figure 7:
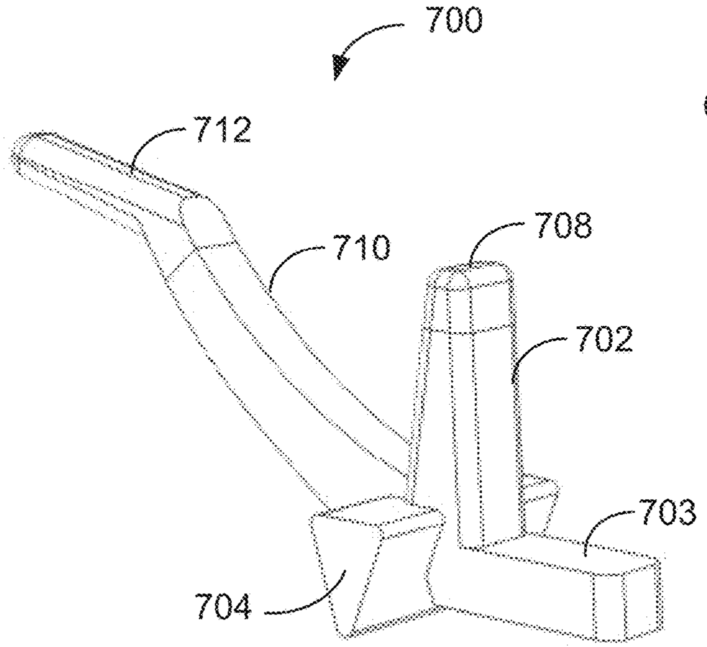
FIG. 7 shows an example device with a triangular prism shaped pivot, in accordance with embodiments of the present disclosure.

As shown in FIG. 5, in some embodiments, pivot 504 is a smooth cylindrically shaped pivot with circular cross-sections. A cylindrically shaped pivot allows for smooth rotation about the pivot for ease in angle adjustments and rotation. However, in some instances, differently shaped pivots can be used to achieve different rotational functions. FIGS. 6 and 7 illustrate various examples of different shaped pivots, in accordance with one or more embodiments of the present disclosure. As with any other part of the device, the pivot also can be removable and swappable with other pivots, enabling various types of rotation pathways. According to various embodiments, round, flat, or pointed geometries give different translation/rotational motions, and therefore different user experiences. FIG. 6 illustrates a pivot with a polygonal prism shape. A polygonal prism is similar to a cylinder, except the instead of circular cross-sections, the cross-sections of a polygonal prism is the shape of a particular polygon. For example, pivot 604 of device 600 can be an octagonal prism, with octagonal shaped cross-sections. The other portions of device 600, such as the lever arm 610, the handle 612, the extended portion 602, the pointed geometry 608, and the weight 603, are coupled to pivot 604 such that the other portions are attached perpendicular to the length of the polygonal prism (i.e., parallel to the plane of a single cross-sectional slice of the polygonal prism). In such embodiments, the flat "edges" of the polygon prism allow for discretized/quantized "stages" of rotation. In addition, the edges allow for more controlled rotation around the pivot. In such embodiments, it may be desirable to "hold" the device at a certain point, or edge, in the translational movement, which would be more easily accomplished with a flat side in the pivot. However, such embodiments do not have the same flexibility as the cylindrical pivot as shown in FIG. 5. FIG. 7 illustrates yet another polygonal prism shaped pivot. FIG. 7 illustrates a device 700 with a triangular prism shaped pivot 704, or a pointed pivot shape. Such embodiments may be useful for users who need more extreme rotation, leading to more torque and/or faster translational movement of the pointed geometry. In such embodiments, the rotation of the device is limited to two positions: upright and laying on the flat side of the pivot. The remaining portions of device 700, such as the lever arm 710, the handle 712, the extended portion 702, the pointed geometry 708, and the weight 703, remain the same.

Figure 8:
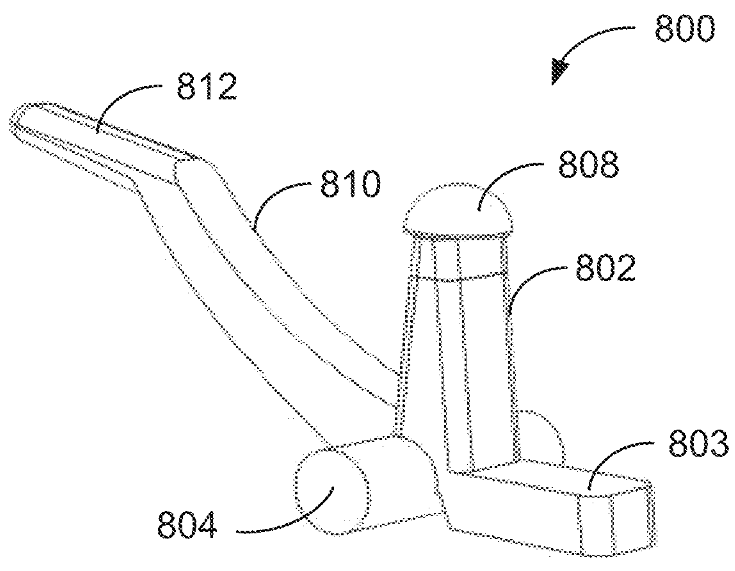
FIG. 8 shows an example device with a spring-loaded bulb, in accordance with embodiments of the present disclosure.
Figure 9:
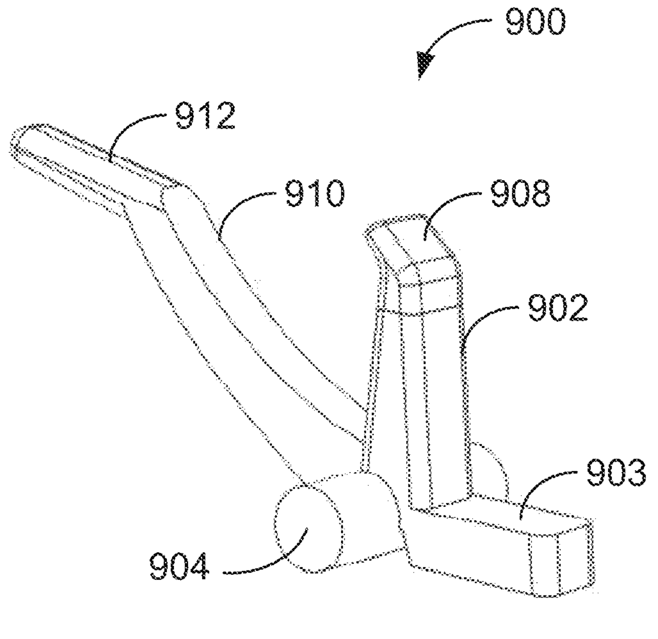
FIG. 9 shows an example device with a bent pointed geometry, in accordance with embodiments of the present disclosure.

As with the pivots, other parts of the device shown in FIG. 5 can also be swapped out for variation. According to various embodiments, different tip types can be pointed, curved, domed, or even spring-loaded. FIGS. 8-10 illustrate devices with different pointed geometries. More specifically, FIG. 8 illustrates a device 800 with a spring-loaded bulb coupled to the pointed geometry 808. Device 800 depicts pivot 804 as a cylindrical pivot, much like pivot 504 of FIG. 5. The other remaining portions, such as the lever arm 810, the handle 812, the extended portion 802, and the weight 803, remain the same. In some embodiments, pointed geometry 808 to be coupled to a spring-loaded bulb to help dampen forces in case a hardened tip is too painful for some users or exerts too much pressure to a sensitive area, such as the groin. In addition, different types of materials can be used to provide different levels of hardness. In some embodiments, the pointed geometry can comprise materials including, but are not limited to plastic, rubber, silicone, foam, and cloth.

As shown in FIG. 8, the pointed geometry can be removable and swappable with other tips, enabling various geometries, heights, durometers, and friction coefficients to be used with the device. This allows the tool to accommodate a broader spectrum of body types and applications for different muscle groups. FIG. 9 shows an example device 900 with a handle 912, a lever arm 910, a pointed geometry 908, a pivot 904, an extended portion 902, and a weight 903, in accordance with embodiments of the present disclosure. FIG. 9 demonstrates a device with a curved or bent pointed geometry 908. The rest of device 900 remains the same as device 800, e.g., with the same pivot, handle, lever arm, extended portion, and weight. However, as demonstrated in FIG. 9, bent pointed geometry 908 is angled in the direction of the lever arm. This allows pressure to be applied at a more extreme inside angle toward the bone for certain muscles located along bones that are angled inside, e.g., the pelvic bone. Although FIG. 9 demonstrates an angle directed toward the lever arm, other embodiments can have the pointed geometry directed toward any direction to accommodate for different bone/muscle angles. For example, pointed geometry 908 could be bent towards the direction along the length of the cylindrical pivot (e.g., 90 degrees rotated/swiveled to the right or left relative to the direction shown in FIG. 9) or toward the weight portion of the device (e.g., 180 degrees rotated/swiveled to the right or left relative to the direction shown in FIG. 9). In some embodiments, pointed geometry 908 can be bent in any angle desired to fit the needs of the user, e.g., for different muscle groups. In some embodiments, pointed geometry 908 can be adjustable by the user. In such embodiments, pointed geometry 908 needs to be able to lock in the desired position using a locking mechanism (not shown).

Figure 10A:
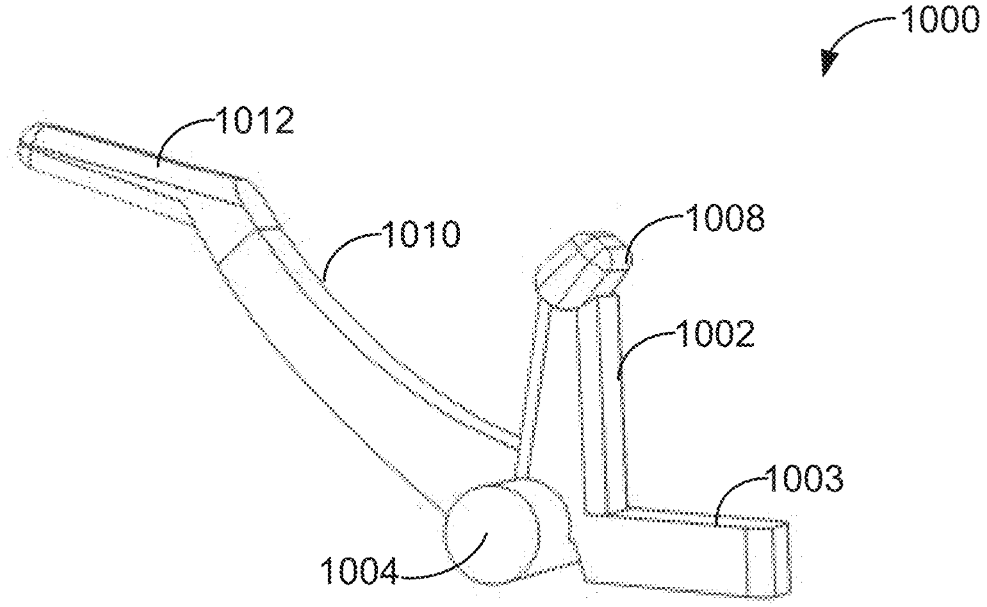
FIGS. 10A-10B illustrate an example of a massage device with an adjustable pointed geometry, in accordance with one or more embodiments of the present disclosure.
Figure 10B:
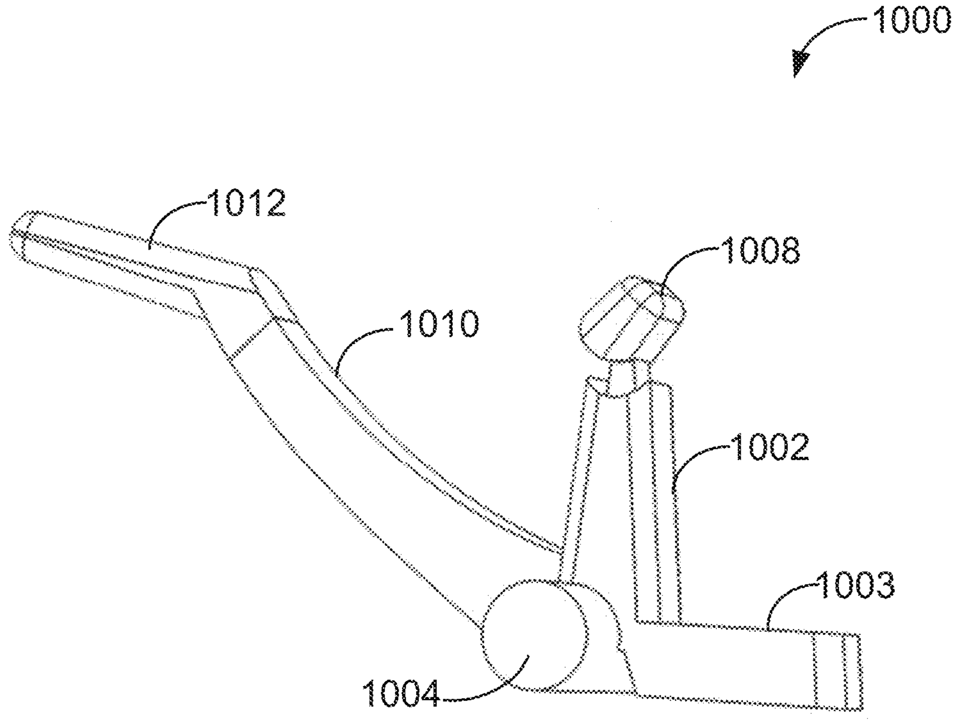

FIGS. 10A-10B illustrate an example of a massage device with an adjustable pointed geometry, in accordance with one or more embodiments of the present disclosure. According to various embodiments, for more versatility, device 1000 includes a single pointed geometry 1008 that is adjustable. The other remaining portions of device 1000, such as the lever arm 1010, the handle 1012, the extended portion 1002, the pivot 1004, and the weight 1003, remain the same. In some embodiments, degrees of adjustability for pointed geometry 1008 can include rotational, height adjustment or a combination thereof. In the upright position, pointed geometry 1008 points straight up, similar to pointed geometry 508 in FIG. 5. In FIG. 10A, pointed geometry 1008 is originally pointed up, but is then rotated toward the direction of the weight, away from the handle. Although the direction of rotation is demonstrated to be toward the weight, it should be noted that the pointed geometry can also be rotated toward the handle or in any direction desired. FIG. 10B illustrates pointed geometry 1008 having rotational and linear movement. Pointed geometry 1008 illustrated in FIG. 10B allows for linear movement in the vertical direction, thereby extending the height of the pointed geometry, as well as rotational movement demonstrated in FIG. 10A. According to various embodiments, adjustable portions include locking mechanisms (not shown) to lock adjustments in place.

Figure 11A:
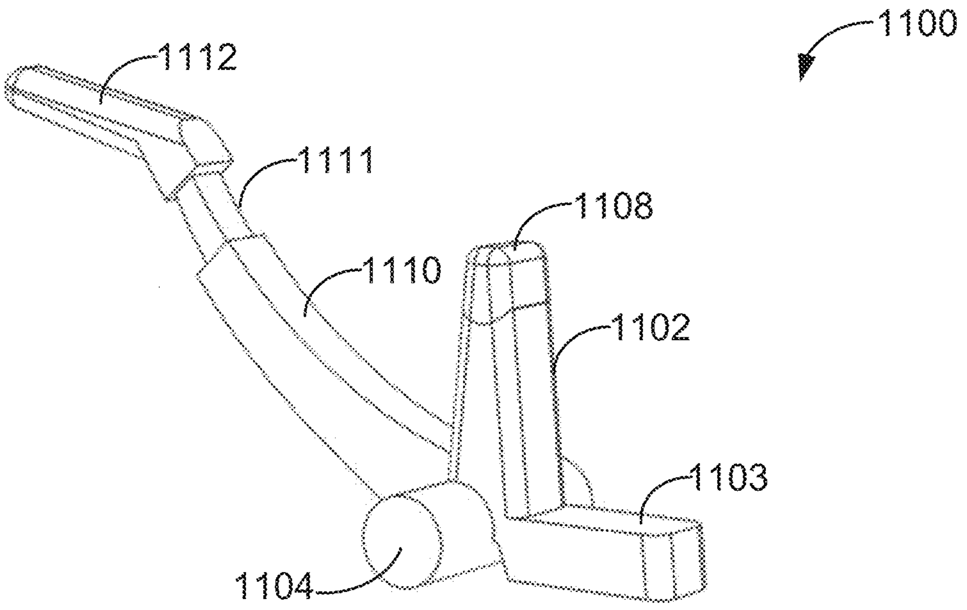
FIGS. 11A-11B illustrate an example of a massage device with an adjustable handle, in accordance with one or more embodiments of the present disclosure.
Figure 11B:
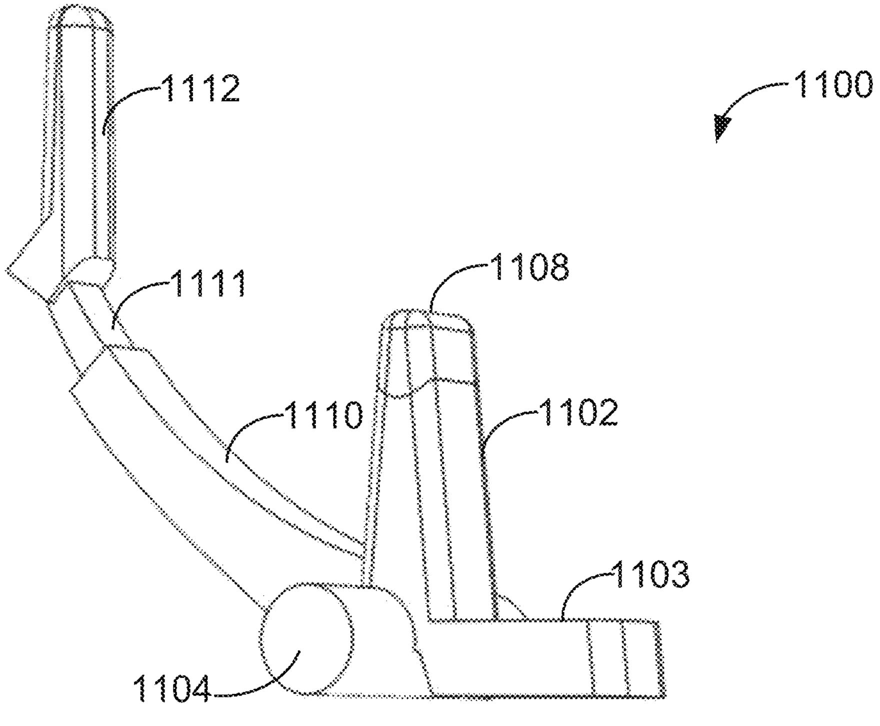

As mentioned above, pointed geometries can be straight or bent in various directions for different angles and functional purposes. Similarly, in some embodiments, devices can have adjustable handles as well. FIGS. 11A-11B illustrate an example of a massage device 1100 with an adjustable handle 1112, in accordance with one or more embodiments of the present disclosure. According to various embodiments, for more versatility, handle 1112 can be made to be adjustable. In some embodiments, degrees of adjustability can include translational, rotational (along various axes), or a combination thereof. FIG. 11A illustrates device 1100 with a pointed geometry 1108, extension portion 1102, pivot 1104, and weight 1103, all of which are similar to analogous features of device 500 in FIG. 5. However, the lever arm 1110 and handle 1112 are configured in a way such that either lever arm 1110 or handle 1112 can be extended linearly, thereby allowing for translational movement. In addition, in some embodiments, handle 1112 can also be rotated or bent in various directions. In the example in FIG. 11A, lever arm 1110 includes an extension mechanism 1111 coupled to handle 1112 such that handle 1112 can be pulled along the length of lever arm 1110. Extending lever arm 1110 allows for adjustments made for larger users. FIG. 11B illustrates device 1100 with lever arm 1110 being extended and handle 1112 being rotated upward. FIG. 11B demonstrates rotational movement in handle 1112, thereby changing the angle handle 1112 makes with lever arm 1110. This rotational functionality allows for a different grip, as well as added leverage. Although FIG. 11A demonstrates extension mechanism 1111 at the point of attachment with handle 1112, in some embodiments, extension mechanism 1111 can be integrated anywhere along lever arm 1110, including the point of connection with pivot 1104. Similarly, although FIG. 11B demonstrates handle 1112 rotating upward, in some embodiments, handle 1112 can also rotate in any direction desirable to the user. According to various embodiments, adjustable portions include locking mechanisms (not shown) to lock adjustments in place.

Figure 12:
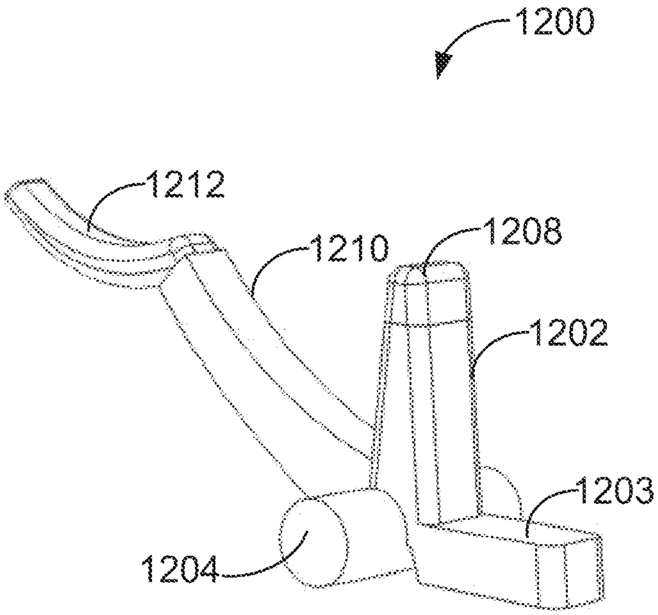
FIG. 12 shows an example device with a curved handle, in accordance with embodiments of the present disclosure.
Figure 13:
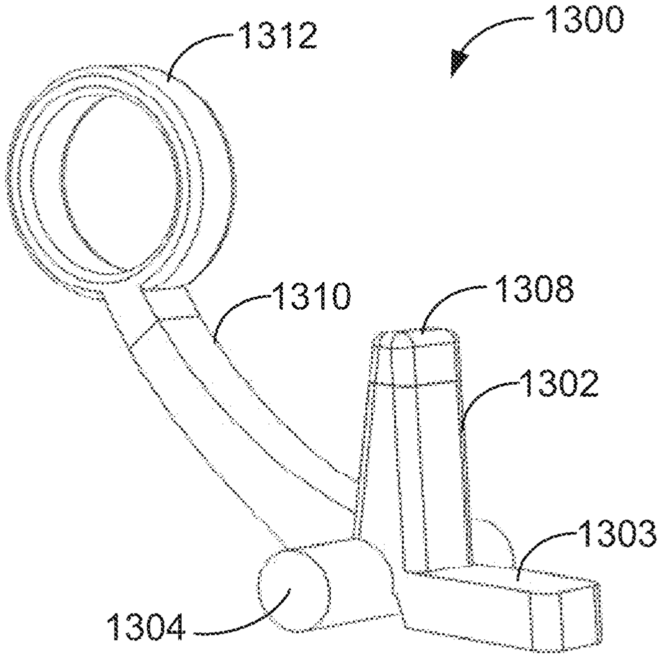
FIG. 13 shows an example device with a ring shaped handle, in accordance with embodiments of the present disclosure.

In addition, to adjustable handles, various embodiments of the present disclosure also include different shapes of handles for a variety of purpose. FIGS. 12 and 13 illustrate various examples of different shaped handles of a massage device, in accordance with one or more embodiments of the present disclosure. As with different pointed geometries, different handles can be used to accommodate different users as well. FIG. 12 illustrates a device 1200 with a curved handle 1212, which may be softer, more flexible for users with weaker wrists. Device 1200 includes pointed geometry 1208, extension portion 1202, pivot 1204, lever arm 1210, and weight 1203, all of which are similar to analogous features of device 500 in FIG. 5. FIG. 13 illustrates a device 1300 with an enclosed circular handle 1312. This allows for an easier gripping of the handle, in addition to reduce the chances of slipping off the handle while exerting force. In addition, the circular shape of handle 1312 allows for different grip angles to allow the user to use a grip that is most comfortable for the user. As with device 1200, device 1300 includes pointed geometry 1308, extension portion 1302, pivot 1304, lever arm 1310, and weight 1303, all of which are similar to analogous features of device 500 in FIG. 5. As with the different types of pointed geometries, as described above, the handles also can be removable and swappable with other handles, enabling various ergonomic grips to be used with this device. This allows the tool/device to accommodate a broader spectrum of body types and applications. According to various embodiments, different handle types can be rigid, compliant, open or closed. As demonstrated herein, each device in FIGS. 12 and13 displays a lever arm, standard pointed geometry, extended portion, a cylindrical pivot, and a weight. However, the different handles can be mixed and matched with any pointed geometry or pivot disclosed herein, or can be paired with or without various types of weights.

Figure 14A:
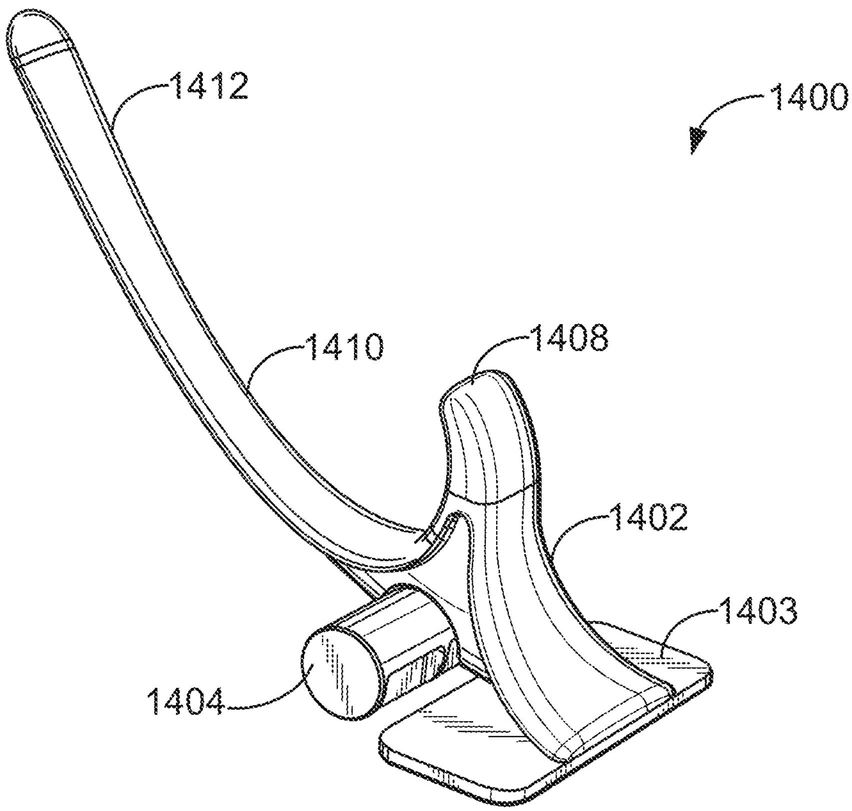
FIGS. 14A-14M illustrate one exemplary embodiment of a massage device, in accordance with embodiments of the present disclosure.
Figure 14B:
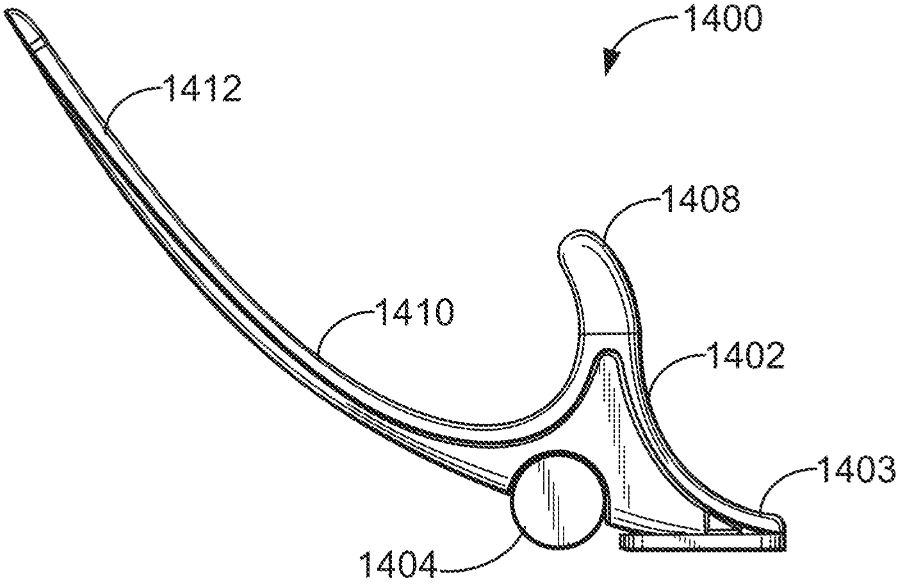

The previous figures all describe various shapes for different parts of a massage device in accordance with embodiments of the present disclosure. FIGS. 14A-14M illustrate a detailed example of an exemplary embodiment of a massage tool/device in accordance with the present disclosure. FIG. 14A illustrates a three dimensional perspective view of an example massage device 1400, showing front, left, and top perspective views. Device 1400 includes pointed geometry 1408, extension portion 1402, pivot 1404, weight 1403, handle 1412, and lever arm 1410. Pivot 1404 is a cylindrical pivot to allow for ease of rotation around the length of the pivot. Weight 1403 is a flat heavy square piece to weigh down device 1400 while in the neutral stand up position. The flat square shape of weight 1403 increases the surface area in contact with the ground, thereby increasing the static friction to help stabilize device 1400. Pointed geometry 1408 is curved/bent in order to increase the angle of the application of the force. Extension portion 1402 has a concave curve on each side of extension portion 1402, i.e., the side proximate to lever arm 1410 and the side proximate to weight 1403. The concave curvature of each side allows for maximum clearance for surrounding body tissue that may fold around extension portion 1402 during engagement of pointed geometry 1408 with the target muscle group. As demonstrated in FIG. 14A, lever arm 1410 and handle 1412 are fused into a single curved piece for grip flexibility and maximum leverage. FIG. 14B presents a two dimensional left side view of device 1400.

Figure 14C:
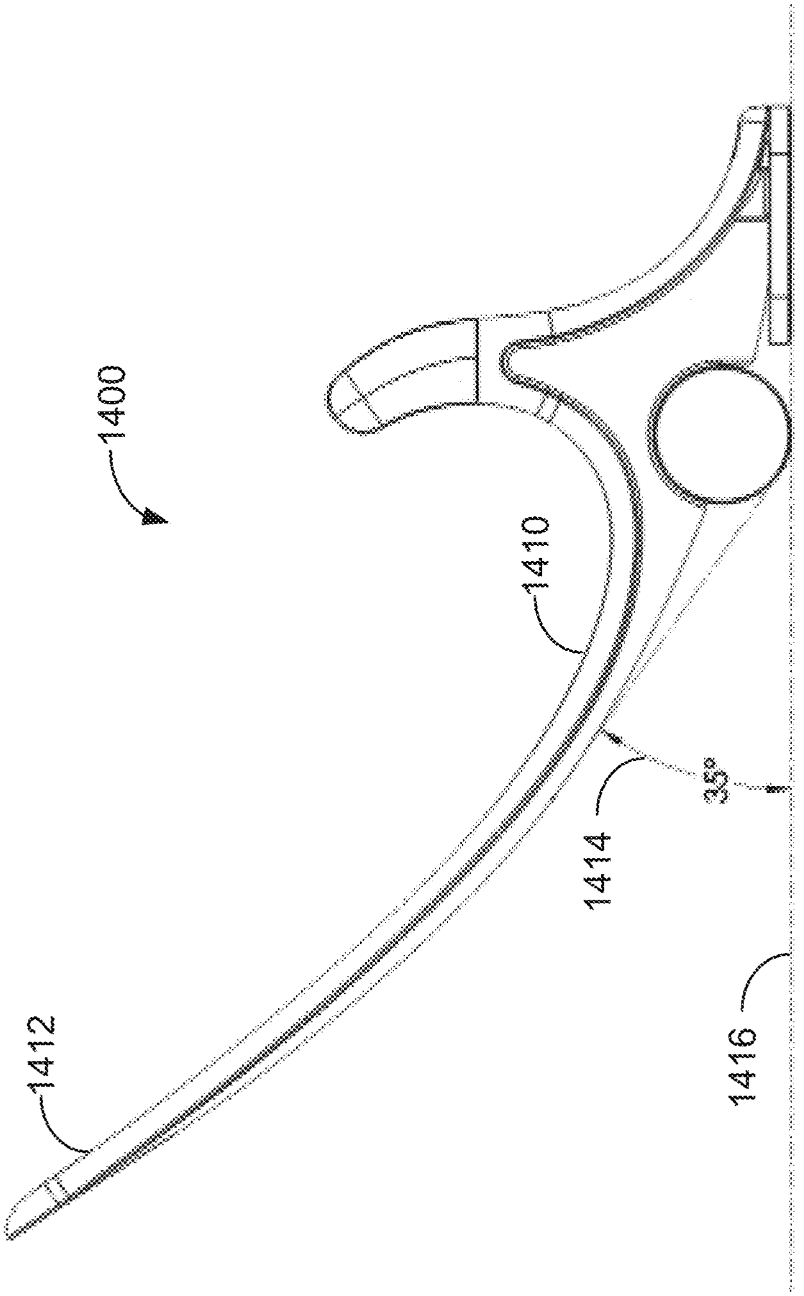

FIG. 14C is a two dimensional left side view of device 1400 demonstrating one angle of curvature of lever arm 1410. FIG. 14C shows lever arm 1410 making an angle 1414 with ground 1416. Angle 1414 represents how much device 1400 can rotate before lever arm 1410 hits ground 1416, causing the rotation to come to a hard stop. In some embodiments, angle 1414 is 35 degrees. The 35 degree of angle 1414 was determined through experimentation to maximize rotation for use with certain muscle groups, such as the iliacus muscle, while still maintaining sufficient clearance space for handle 1412. However, in other embodiments, the angle can vary depending on the particular muscle groups targeted.

Figure 14D:
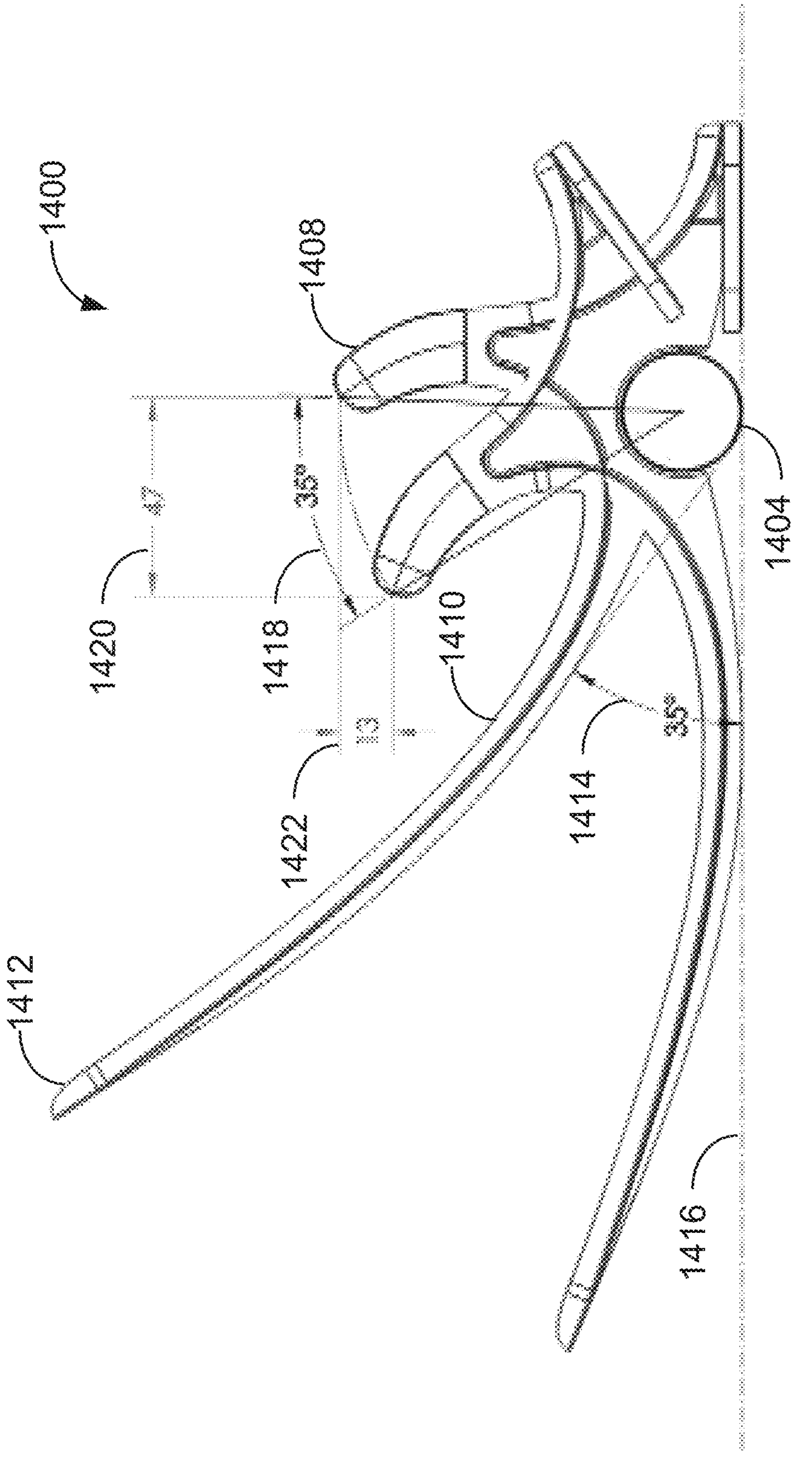

FIG. 14D illustrates device 1400 being rotated the full 35 degrees about pivot 1404. As shown in FIG. 14C, angle 1414 between lever arm 1410 and ground 1416 is approximately 35 degrees, in this particular example. Thus, during a full rotation about pivot 1404, pointed geometry 1408 also rotates at approximately a 35 degree angle 1418, which is equivalent to angle 1414. It should be noted that in one particular embodiment, the horizontal translational distance 1420 traveled by pointed geometry 1408 during rotation is 47 mm, while the vertical translational distance 1422 traveled by pointed geometry 1408 during rotation is 13 mm. Massage device 1400 was particularly designed in order for pointed geometry 1408 to move 47 mm horizontally and 13 mm vertically. These numbers were derived empirically through much experimentation and found to give the average human body the most therapeutic relief while minimizing discomfort. However, it should be noted that many other embodiments for massage device 1400 can also be possible to achieve different translational distances both horizontally and vertically, in order to accommodate larger or smaller bodies, as well as different muscle groups that require larger or smaller angles of rotation.

Figure 14E:
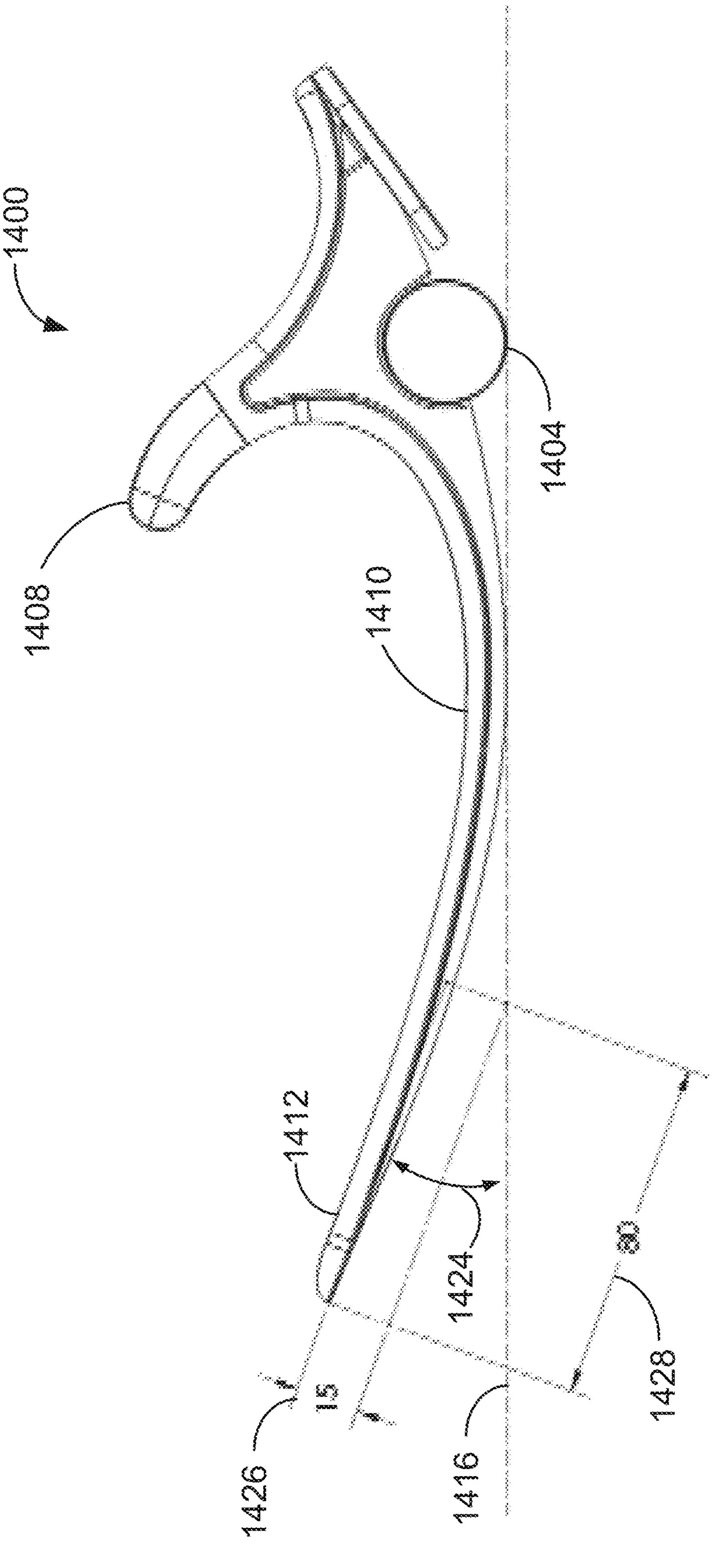

FIG. 14E depicts device 1400 after a full rotation about pivot 1404. Although handle 1412 and lever arm 1410 are fused together in device 1400, FIG. 14E illustrates the difference in the sectioning of handle 1412 and lever arm 1410. As previously mentioned in FIG. 14C, lever arm 1410 is angled at approximately 35 degrees from ground 1416. In addition, in some embodiments, handle 1412 has an additional angle of deviation away from lever arm 1410. FIG. 14E illustrates handle 1412 curving away from lever arm 1410 towards pointed geometry 1408 at an angle 1424. Angle 1424 allows for handle 1412 to still have enough clearance for a user's hand even after fully rotating device 1400 the entirety of angle 1414, meaning a portion of lever arm 1410 is in contact with ground 1416. In the example given in FIG. 14E, given a minimum horizontal clearance length of 80 mm, the minimum vertical clearance height of a location on handle 1412 that is 80 mm from the tip of handle 1412 is 15 mm. Once again, these numbers are derived empirically for the average human body through repeated experimentation. In the example given in FIG. 14E, the additional angle 1424 that gives the minimum distances is approximately 18 degrees. However, it should be noted that the actual value of angle 1424, as well as the values of minimum distances 1426 and 1428, can vary depending on the user and the type of muscle group targeted.

Figure 14F:
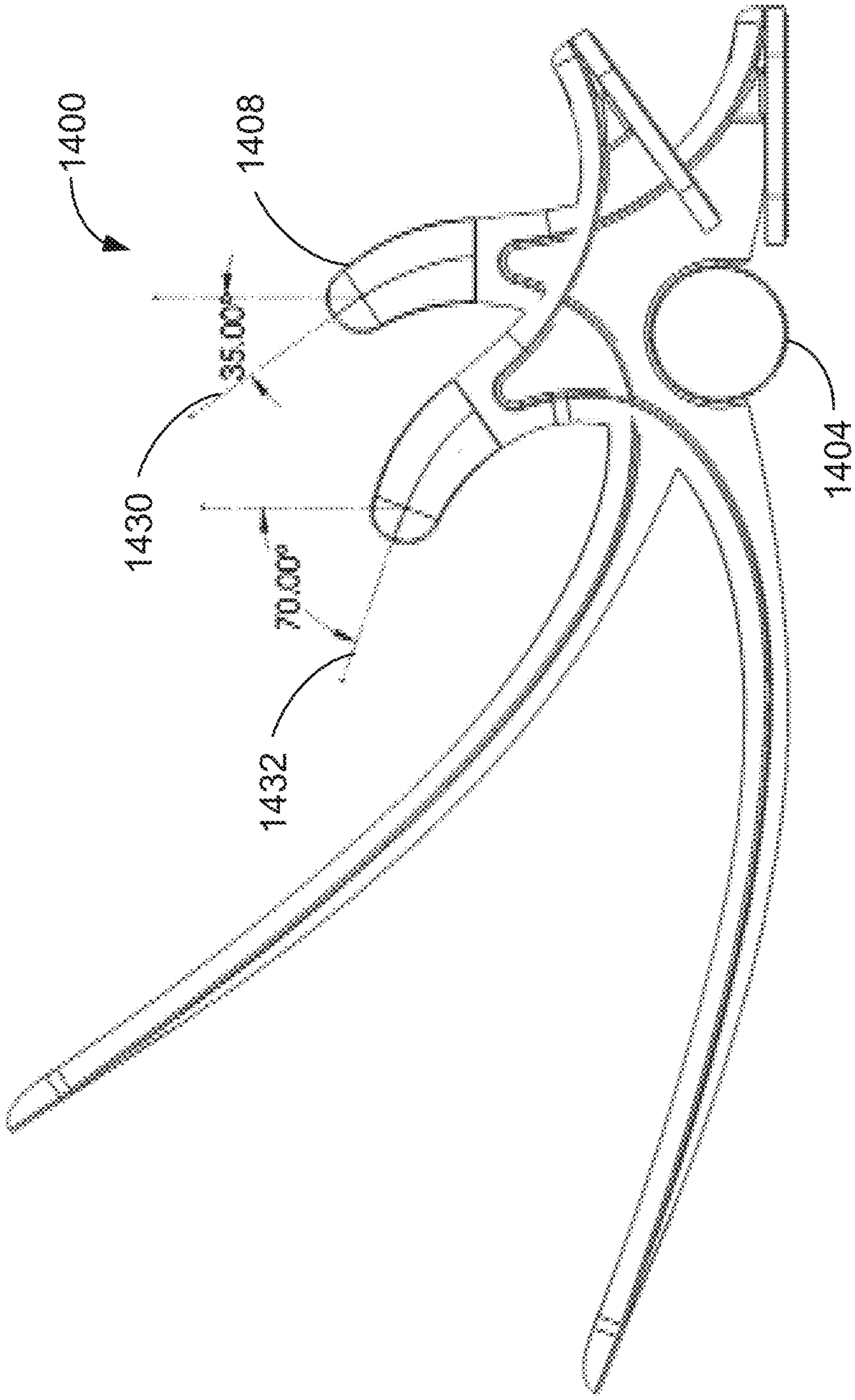

FIG. 14F illustrates the angle at which pointed geometry 1408 is bent. In some embodiments, pointed geometry 1408 is originally bent at an angle 1430 from the vertical. This is because many muscle groups, such as the iliacus muscle, are already oriented at an angle when the user is facing directly toward the ground. In this example, angle 1430 is approximately 35 degrees, which was empirically derived through experimentation to give the angle that encounters many commonly targeted muscle groups, i.e., muscle groups that are not perpendicular to the vertical when the user is facing the ground. As with the other angles described above, the actual value of angle 1430 can vary depending on the muscle group being targeted. FIG. 14F also shows rotated angle 1432, which represents the angle that pointed geometry 1408 makes with the vertical after a full rotation about pivot 1404. In this example, since the angle 1414 of lever arm 1410 is approximately 35 degrees, the value of angle 1432 is approximately 70 degrees from the vertical.

Figure 14H:
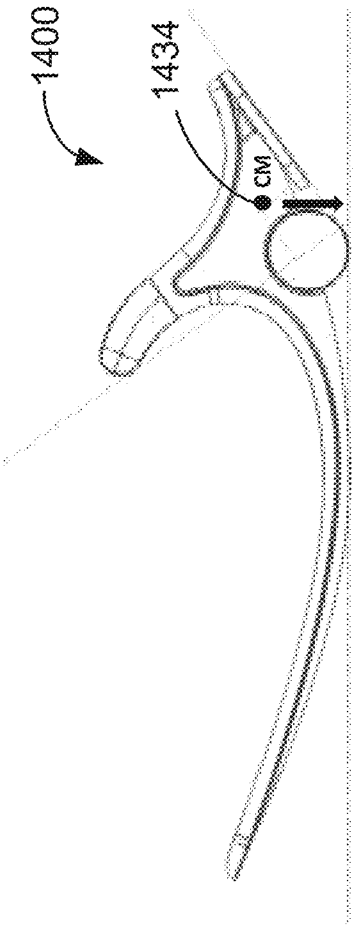
Figure 14G:
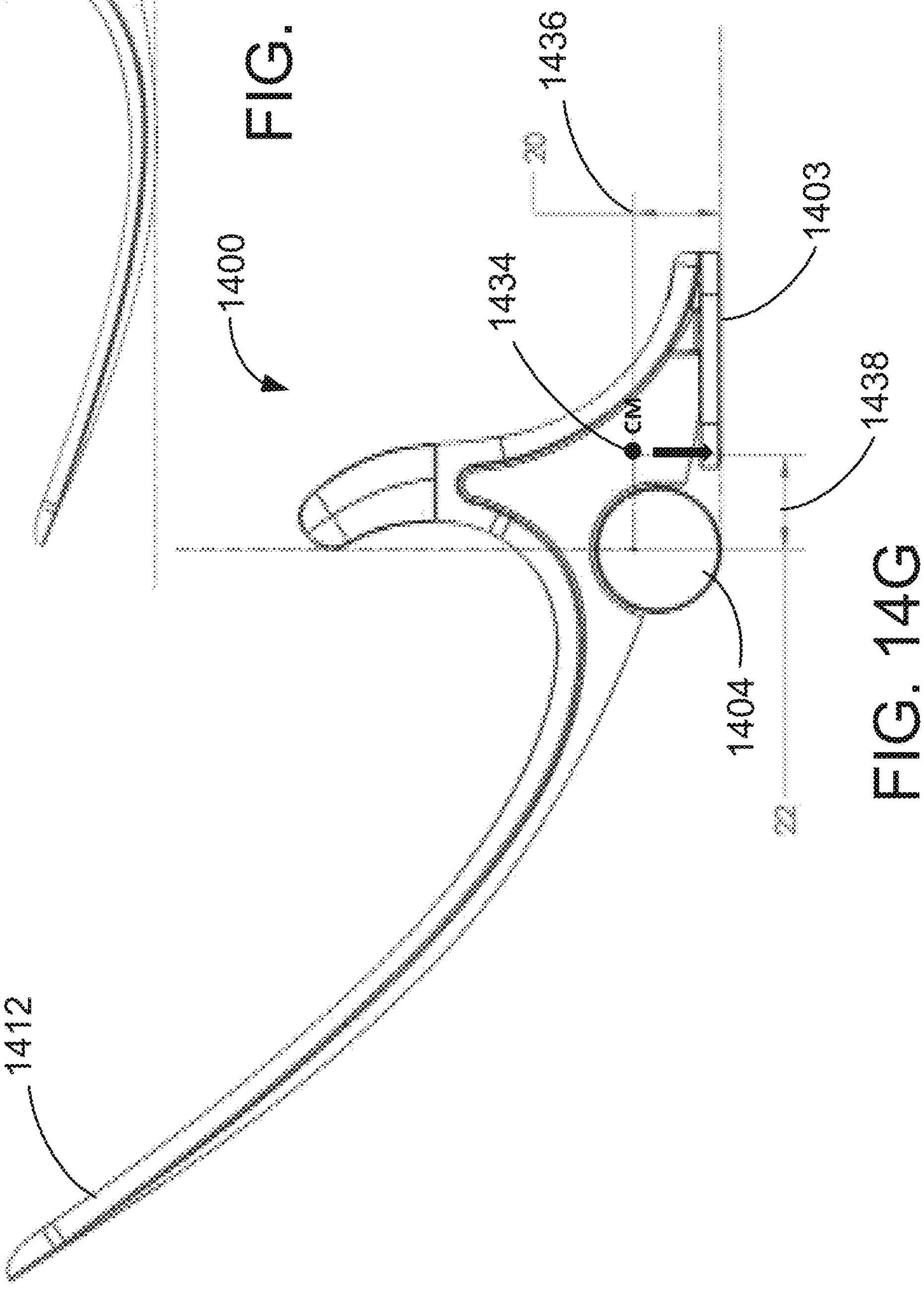
Figure 14I:
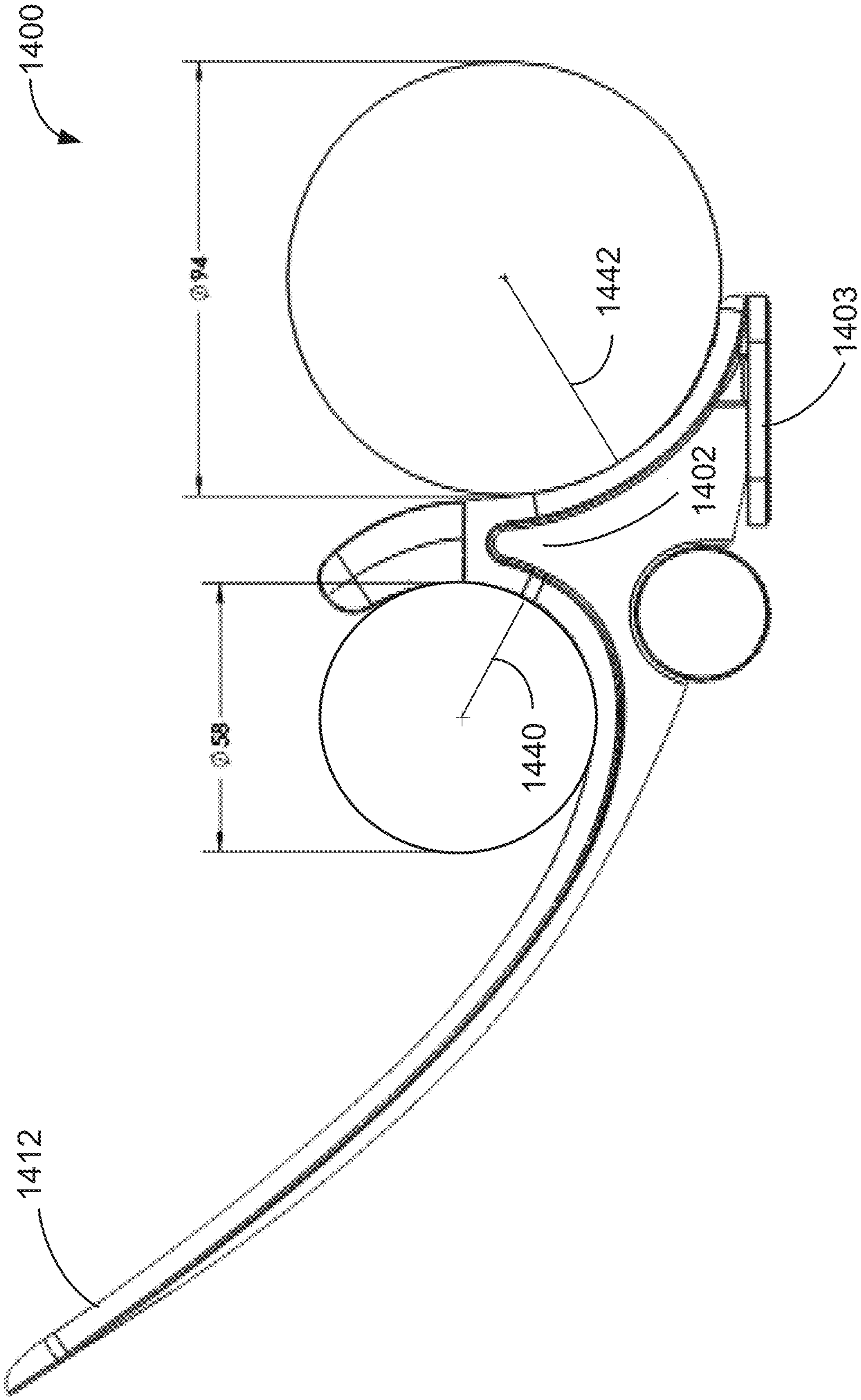

FIGS. 14G-14H illustrate how weight 1403 of device 1400 is designed to shift the center of mass of device 1400 to a low position opposite handle 1412. As shown in FIG. 14G, weight 1403 shifts the center of mass (CM) to position 1434 with a height 1436 and a distance 1438 from the center of pivot 1404 on the side that is opposite of handle 1412. In this example, CM height 1436 is approximately 20 mm and CM distance 1438 is approximately 22 mm from the center of pivot 1404. In some embodiments, having the CM in location 1434 is necessary to ensure that the weight of device 1400 (not to be confused with weight 1403) is always working to force device 1400 to sit on weight 1403, even when device 1400 is fully rotated back to the floor, as demonstrated in FIG. 14H. In such embodiments, having device 1400 always trying to reorient itself to the default position, i.e., the standing upright position, helps with the stability of device 1400, especially during usage. As with other numbers explicitly given above, CM position 1434, with CM height 1436 and CM distance 1438, was derived empirically through experimentation. CM position 1434 can have different height and distance values, as long as it allows device 1400 to constantly want to reorient back into the default position.

Figure 14J:
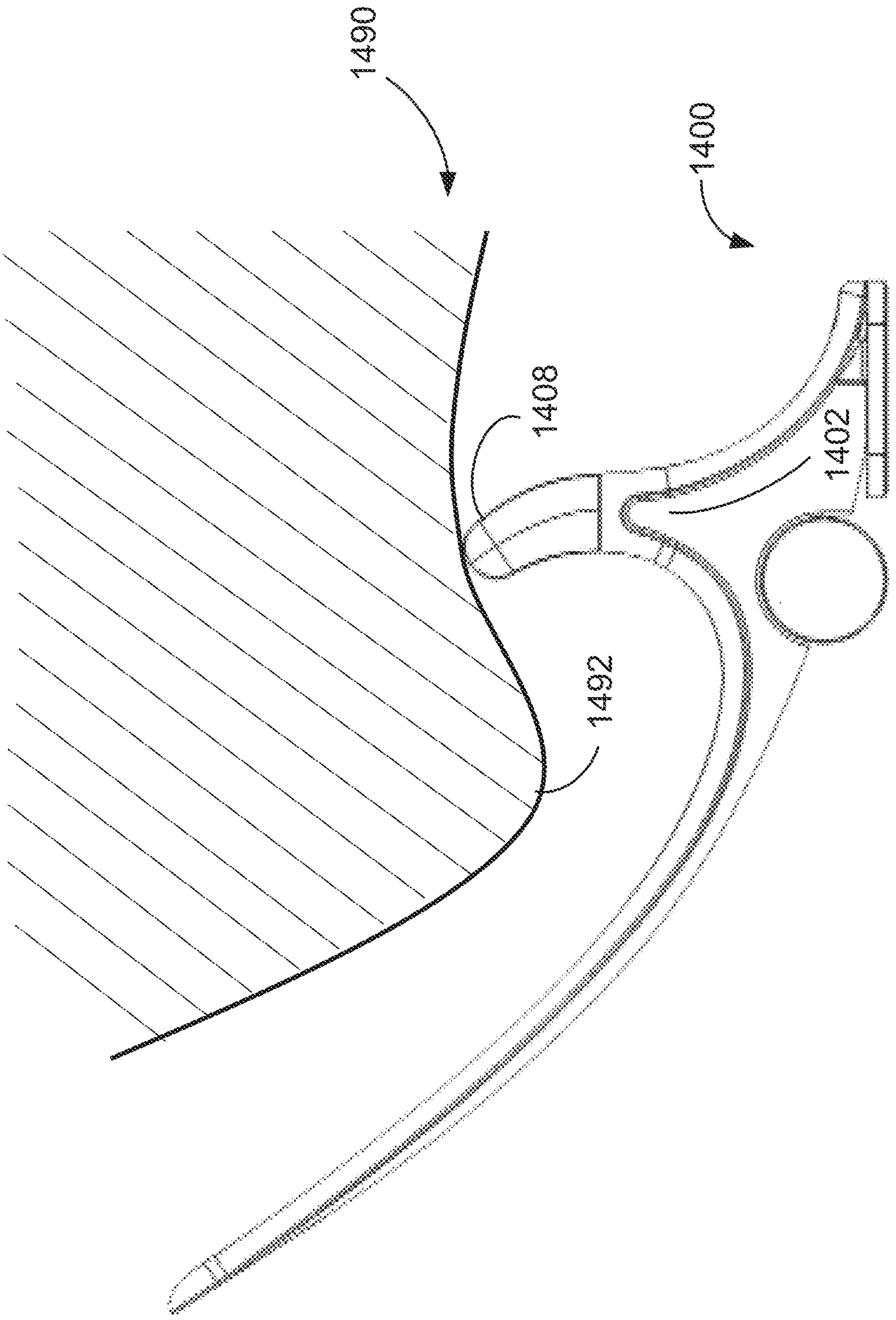
Figure 14K:
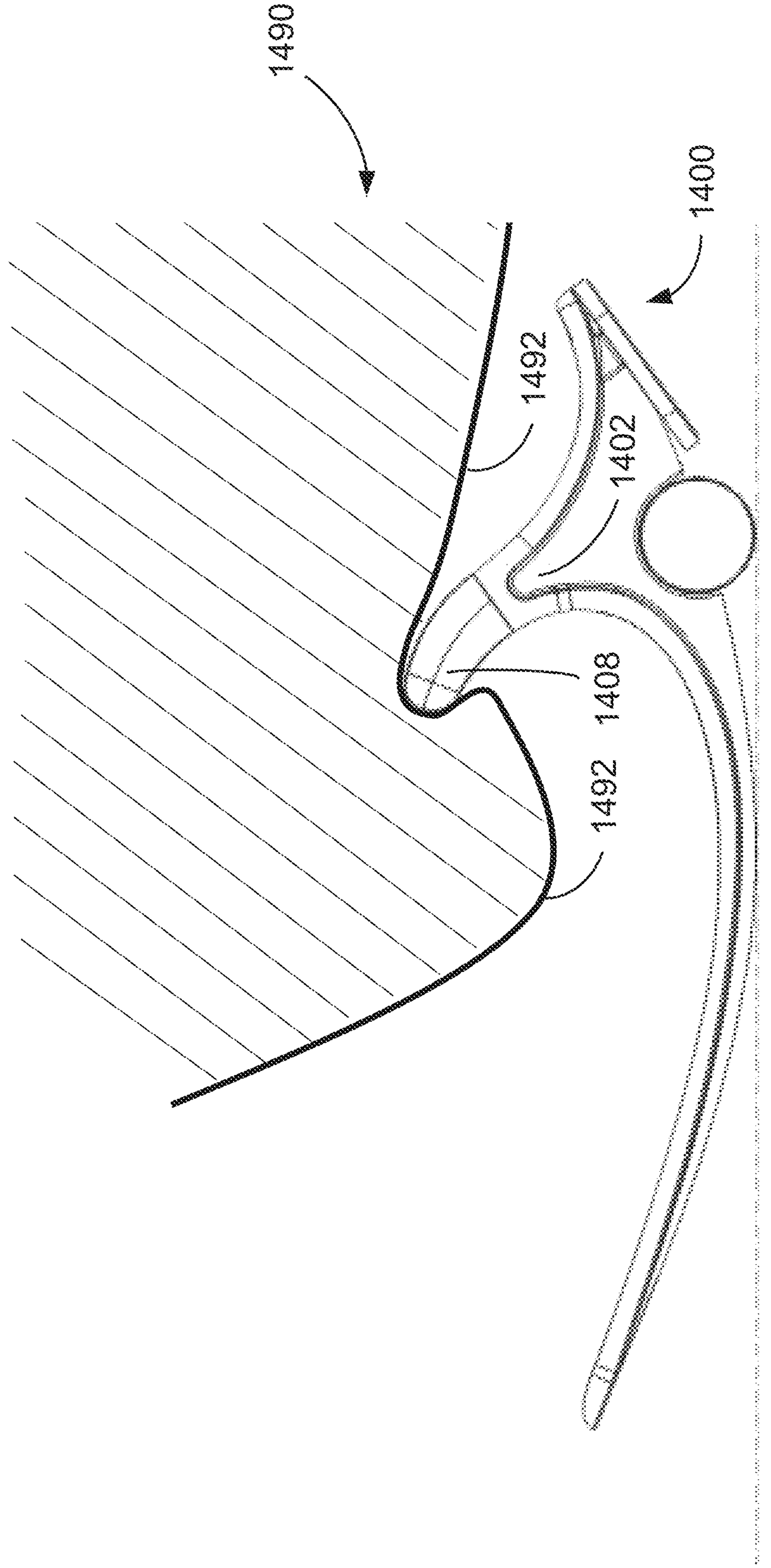

As previously mentioned, in some embodiments, extension portion 1402 of device 1400 is concave on both sides. The reason for this curvature on both sides is to make room for the user's body when in contact with pointed geometry 1408 of device 1400. FIG. 141 illustrates the radius of curvature for both sides of extension portion 1402. In the example, the radius of curvature 1440 of the side of extension portion 1402 closer to handle 1412 is 29 mm. The radius of curvature 1442 of the side of extension portion 1402 closer to weight 1403 is 47 mm. As with other numbers explicitly given in the present disclosure, radii of curvature 1440 and 1442 were derived empirically through much experimentation in order to implement a design for massage device 1400 that gives sufficient room for the average body to use device 1400 without fear of excess body tissue getting in the way and impeding full utilization of device 1400. The actual value of the radii can vary depending on the size and body type of the user. FIG. 14J illustrates device 1400 in default position with pointed geometry 1408 in contact with body tissue 1490 of a user. In FIG. 14J, excess body tissue portion 1492 folds over bent pointed geometry 1408 during contact with body tissue 1490. However, as illustrated in FIG. 14J, the gap caused by the concave shape of the sides of extension portion 1402 prevent the excess body tissue portion 1492 from touching the rest of device 1400, thereby preventing excess body tissue portion 1492 from impeding full rotation of device 1400. FIG. 14K illustrates device 1400 in full rotated position with pointed geometry 1408 in contact with body tissue 1490 of a user. As demonstrated in FIG. 14K, the gaps or pockets created by the concave nature of both sides of extension portion 1402 allow for excess body tissue portion 1492 from hitting the sides of extension portion 1402, thereby preventing excess body tissue portion 1492 from counteracting against the full rotation of device 1400.

Figure 14L:
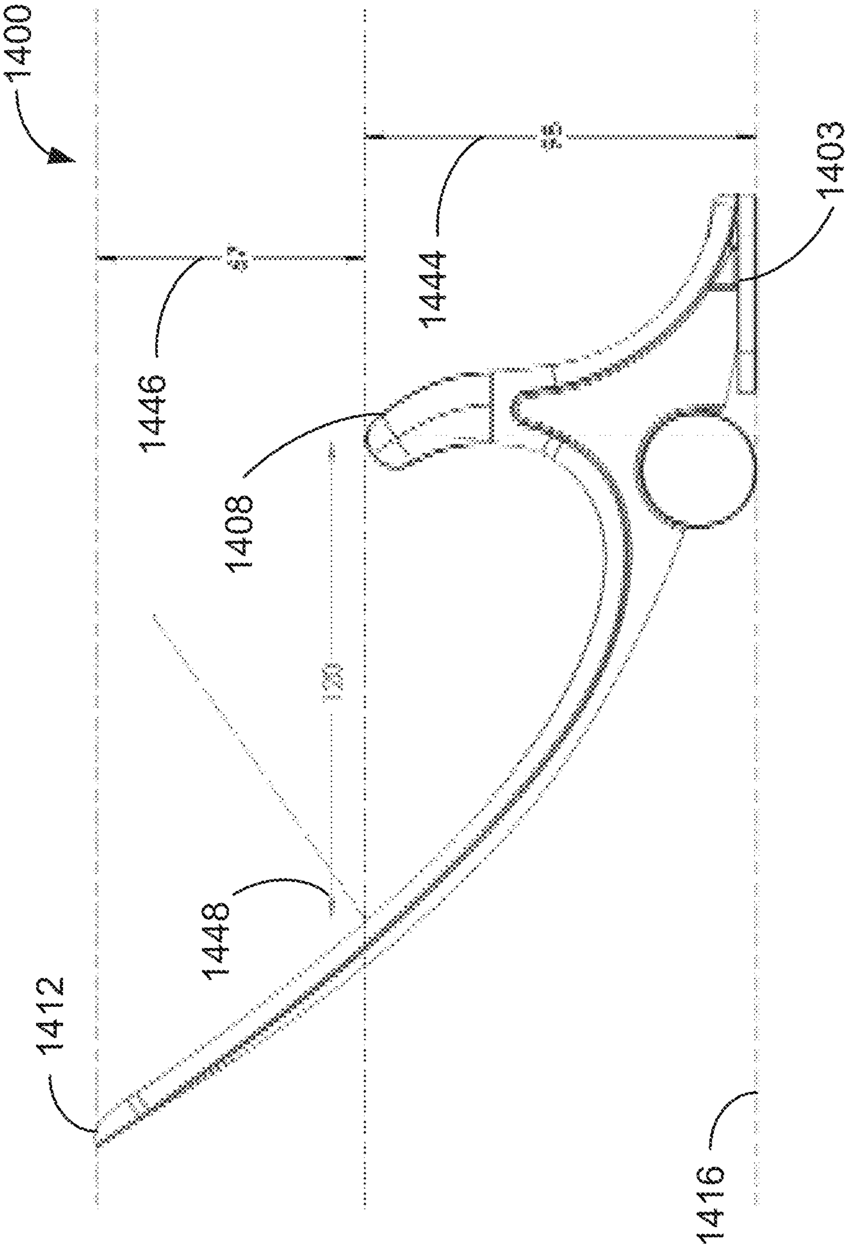

As described above, the numbers for angles, heights, and distances were all derived empirically during discovery of the "best" design for a massage device. FIG. 14L illustrates a few more measurements that were meticulously derived through experimentation in order to achieve one embodiment of an ultimate massage tool/device. Device 1400 of FIG. 14L includes a height 1444 from the bottom of weight 1403 (or ground 1416) in default position to the top of pointed geometry 1408 (in default position). In addition, device 1400 includes height 1446, which is the height from the top of pointed geometry 1408 to the top/tip of handle 1412. Last, device 1400 also includes distance 1448, which is the horizontal distance between the top of pointed geometry 1408 to a point on handle 1412 at the same height as the top of pointed geometry 1408. In this example, height 1444 is approximately 98 mm, height 1446 is approximately 67 mm, and distance 1448 is approximately 120 mm. Height 1446 and distance 1448 were empirically derived while searching for the best ergonomic fit for an average human body, while maintaining a compact design. Height 1444 was empirically derived while trying to find the right amount of pressure when a user initially lies on device 1400. During experimentation, taller heights were found to be too painful for users and shorter heights did not provide enough pressure for effective treatment. However, as with all numbers explicitly given in the present disclosure, the numbers provided in reference to FIG. 14L are just one set of numbers for describing device 1400. Other values for heights 1444 and 1446, as well as distance 1448, can be used depending on the size of the individual or the type of muscle group targeted.

Figure 14M:
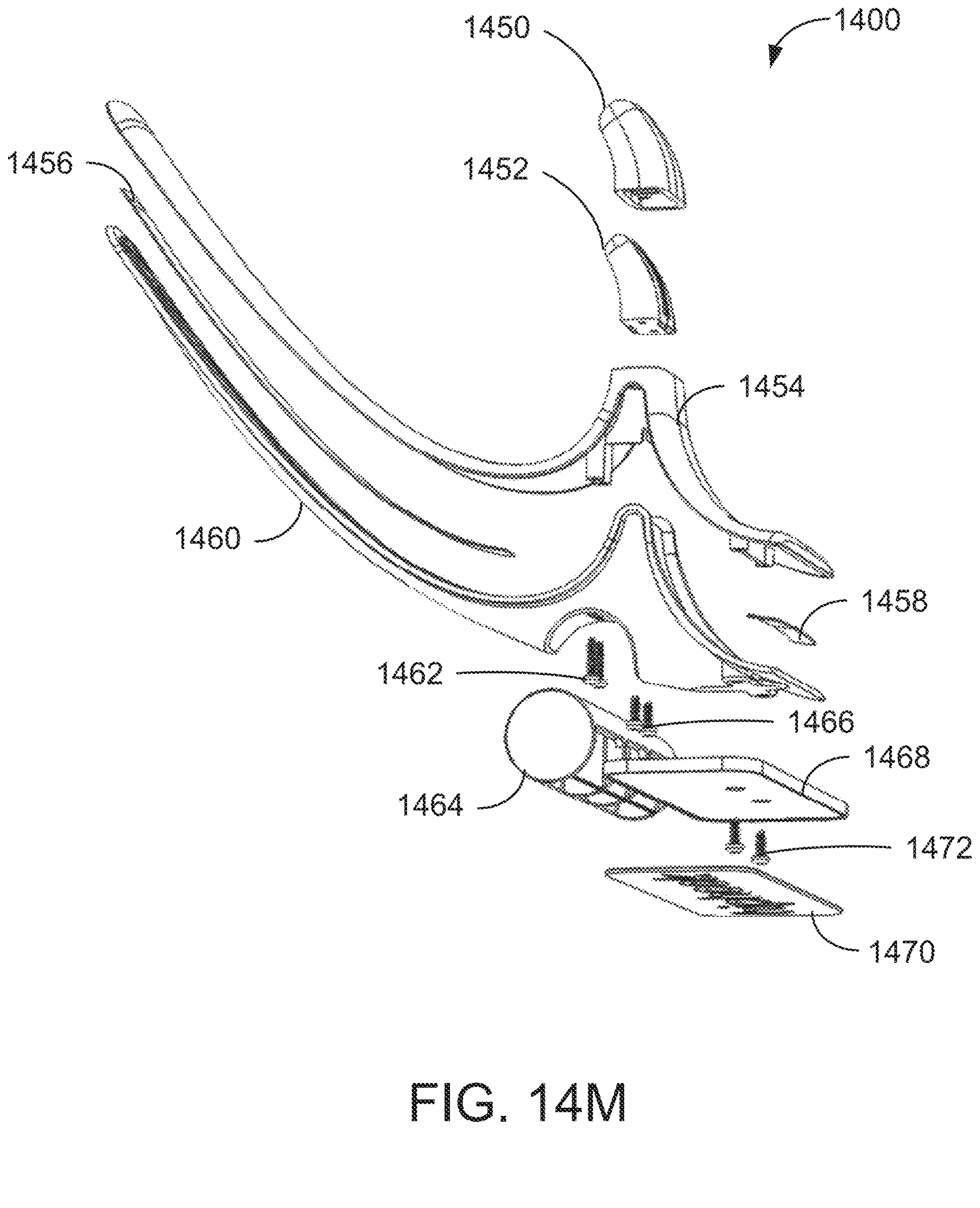

Although there are many ways to design an embodiment of massage device 1400, FIG. 14M demonstrates just one example of component parts that make up an exemplary embodiment of device 1400. More specifically, FIG. 14M shows an exploded view of an example embodiment of device 1400. Pointed geometry 1408 can be made up of two pieces, outer shot 1450 and inner shot 1452. Outer shot 1450 is made of a rubber material which adds comfort to the user upon contact. In some embodiments, outer shot 1450 need not be rubber, but would preferably be a material that is flexible and compliant in order to alleviate direct pressure when in use. By contrast, inner shot 1452 comprises a harder material such as acrylonitrile butadiene styrene (ABS), or some other plastic material. The important feature of inner shot 1452 is that it should probably be made of a firmer, stiffer material in order to maintain the integrity of the pointed geometry's form during usage.

In some embodiments, extension portion 1402 comprises two different pieces of polycarbonate material, upper piece 1454 and lower piece 1460. Each of the pieces of extension portion 1402 should comprise a stiff material, such as polycarbonate, or other lightweight but strong material. Metal can also be used for these pieces, but the weight 1403 would need to be much heavier in order to keep the CM low and opposite side of pivot 1404. Upper piece 1454 and lower piece 1460 also form lever arm 1410 and handle 1412. The two pieces can be joined by screws 1462. In some embodiments, optional middle pieces 1456 and 1458 can be inserted in between upper piece 1454 and lower piece 1460 in order to increase the durability of the relative sections that the middle pieces are supporting.

Device 1400 also includes pivot 1404, which is comprised of a cylindrical piece 1464 bolted to lower piece 1460 by screws 1466. As demonstrated in FIG. 14M, cylindrical piece 1464 need not be a fully formed cylinder, as long as a "frame" of a cylinder is sufficiently present to allow device 1400 to rotate about pivot 1404. In some embodiments, cylindrical piece 1464 also comprises a polycarbonate material.

Last, device 1400 also includes weight 1403. In FIG. 14M, weight 1403 is comprised of strong, sturdy, and heavy material because it serves as the counterweight to handle 1412, lever arm 1410, and pivot 1404. In some embodiments, weight 1403 comprises a bulk piece 1468, which is bolted to lower piece 1460 with screws 1472. In some embodiments, bulk piece 1468 is stainless steel, or another sturdy and heavy material, such as a metal, in order to shift the CM toward weight 1403. While bulk piece 1468 need not be metal, ideally it should be a material that is much heavier than the material that comprises upper piece 1454 and lower piece 1460. In some embodiments, weight 1403 also comprises optional friction pad 1470, which is ideally made of a material with a high coefficient of friction, such as rubber, to prevent slipping and increase stabilization of device 1400 during usage. It should be noted that the component parts explicitly described with reference to FIG. 14M are just one combination of component parts that can make a massage tool/device in accordance with embodiments of the present disclosure. It should also be noted that any combination of the parts described above along with any other parts described, or even not described, throughout the present disclosure can be combined to form a massage device in accordance with the present disclosure, as long as it can be used to provide trigger point or pressure release of a muscle or muscle group.

Figure 15A:
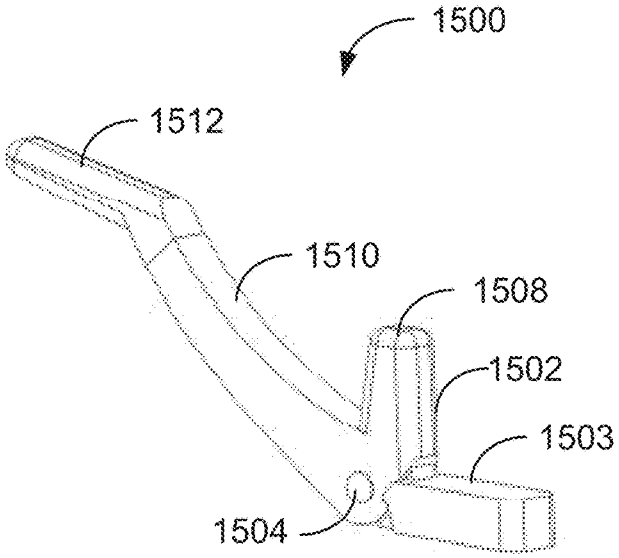
FIGS. 15A-15C illustrate an example of a massage device with an adjustable pivot, in accordance with embodiments of the present disclosure.
Figure 15B:
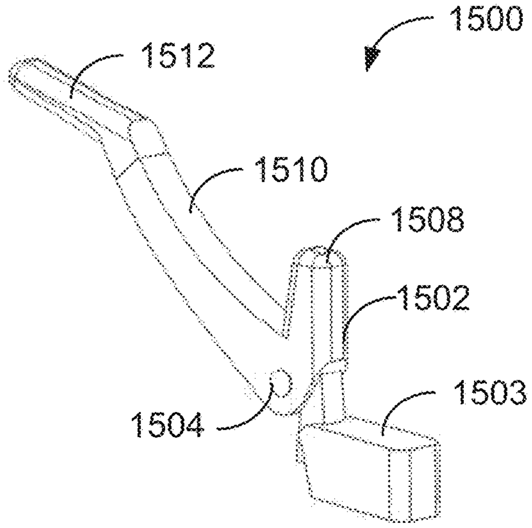
Figure 15C:
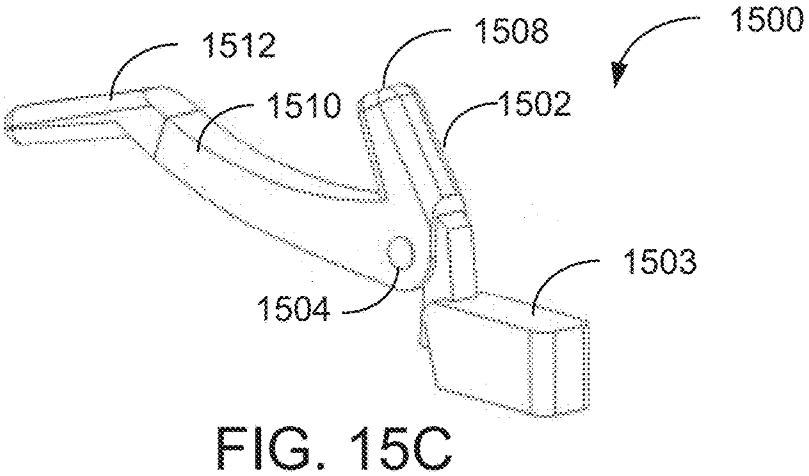

FIGS. 14A-14M illustrate only one example of a massage device, in accordance with embodiments of the present disclosure. FIGS. 15A-18C illustrate other example variations of a massage device, in accordance with embodiments of the present disclosure. According to various embodiments, for more versatility, the pivot position can also be made to be adjustable. FIGS. 15A-15C illustrate a device 1500 with an adjustable pivot 1504. In some embodiments, by enabling different pivot positions, the user can experiment with various torques, final positions, and travel amounts for ideal treatment. Device 1500 includes lever arm 1510, handle 1512, weight 1503, extended portion 1502, pivot 1504, and pointed geometry 1508. In FIG. 15A, pivot 1504 is an adjustable joint, rather than a geometric shape over which the other portions rotate. Pivot 1504 is also a rotatable joint configured such that lever arm 1510 can rotate up and down around pivot joint 1504 thereby applying translational motion to pointed geometry 1508. FIG. 15B illustrates device 1500 demonstrating an adjustable height for pivot 1504, thereby adjusting the height of pointed geometry 1508. FIG. 15C illustrates device 1500 rotating about pivot joint 1504 while in the elevated state.

Figure 16A:
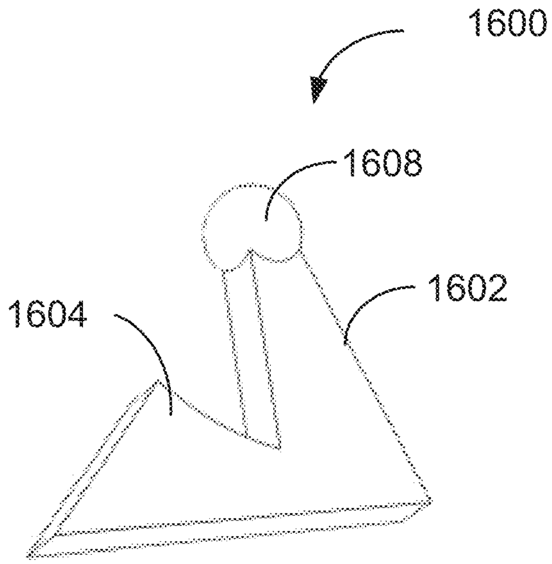
FIGS. 16A-16C illustrate examples of various bases of example massage devices, in accordance with embodiments of the present disclosure.
Figure 16B:
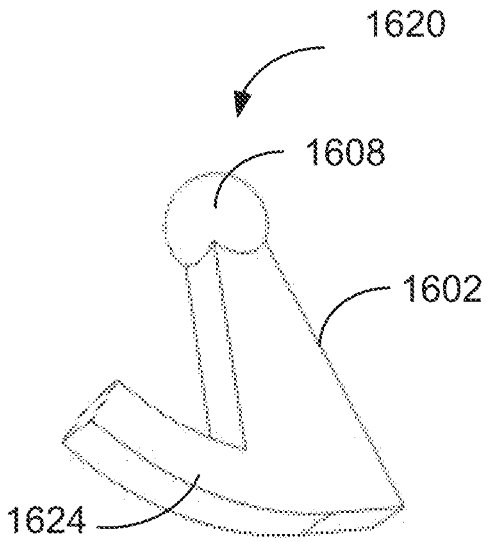
Figure 16C:
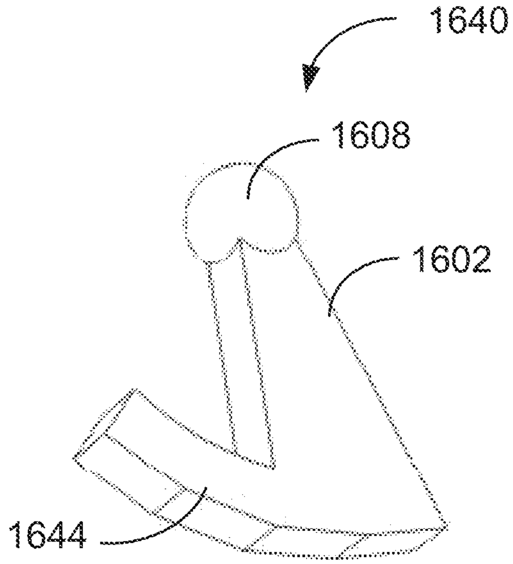

FIGS. 16A-16C illustrate examples of various bases of example massage devices, in accordance with embodiments of the present disclosure. The devices depicted in these examples contain only a base, an extension piece, and a rounded tip. The simpler designs of FIGS. 16A-16C may be desirable in some cases where smaller size of the device is desirable. Each device includes pointed geometry 1608 and extension portion 1602. The devices can be constructed with different shapes for the bottom of the base. The shapes can be flat, rounded or notched where it touches the ground. FIG. 16A depicts device 1600 with a flat base 1604. This embodiment has great stability, but does not allow for rotation about a pivot. Device 1600 may be useful for releasing muscles that can be directly accessed without the needed for added rotation, or for users that can add their own rotation by contorting parts of their body. FIG. 16B depicts device 1620 with a rounded base 1624. Base 1624 is similar to cylindrical pivot 504 in FIG. 5. FIG. 16C shows device 1640 with a notched base 1644. Base 1624 is similar to polygonal prism pivot 604 in FIG. 6. As with the devices depicted in FIGS. 5 and 6, the devices in FIGS. 16B-16C are designed to rotate or "roll" over the base, thereby providing translational movement to rounded tip 1608 and extension portion 1602. The examples depicted in FIGS. 16A-16C are just a few examples of simplified designs for a muscle pressure release tool. The vital aspect of the shapes in these examples is that a tip is attached to a base that is either stable or movable and that can be placed on the ground.

Figure 17A:
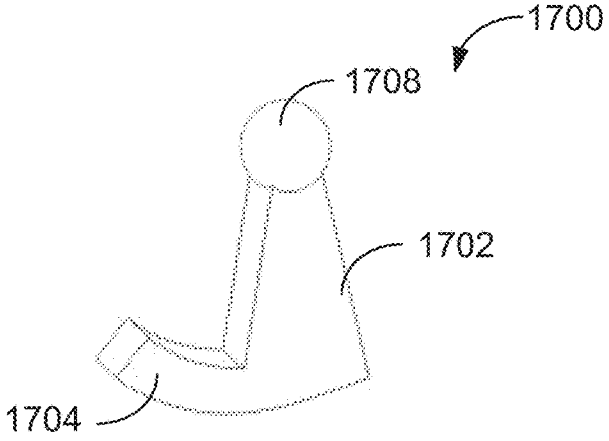
FIGS. 17A-17D illustrate examples of various tips of example massage devices, in accordance with embodiments of the present disclosure.
Figure 17B:
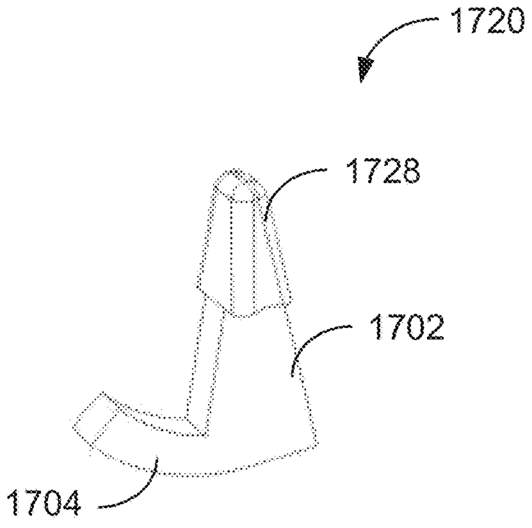
Figure 17C:
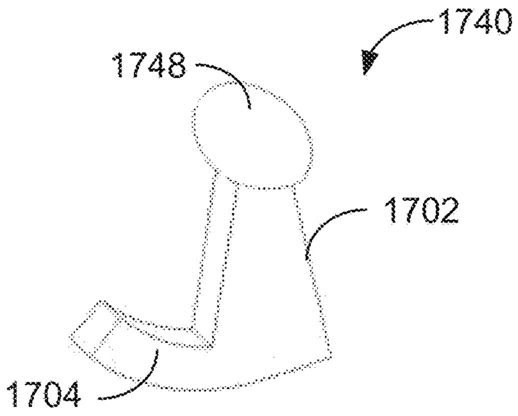
Figure 17D:
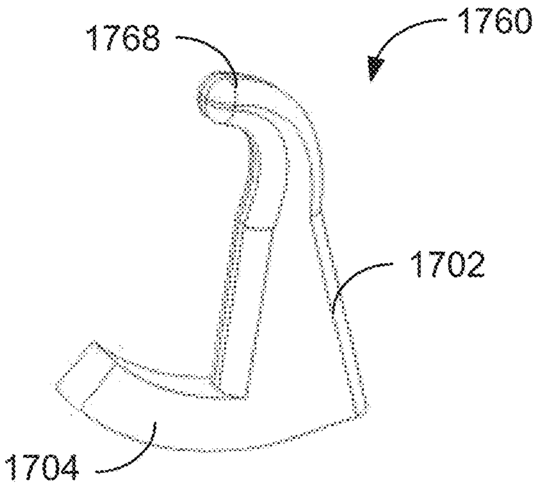

FIGS. 16A-16C illustrate examples of simple embodiments with varying bases. In some embodiments, the size and shape of the tip for simple embodiments can vary as well. FIGS. 17A-17D illustrate examples of various tips of example massage devices, in accordance with embodiments of the present disclosure. These figures illustrate the various different tip shapes for a simplified massage tool design. Each device includes an extension portion 1702 and a curved base 1704. However, the shapes and sizes of the pointed geometries can vary for different functions. For example, FIG. 17A illustrates device 1700 with a spherical pointed geometry 1708. Spherical tip 1708 is similar to tip 1608 in FIGS. 16A-16C. FIG. 17B shows device 1720 with a pointed tip 1728. Pointed tip 1728 is similar to pointed geometry 508 in FIG. 5. FIG. 17C shows device 1740 with an elliptical tip 1748. Elliptical tip 1748 is like a bent version of rounded tip 1708, for usage against a muscle at a more extreme angle. FIG. 17D shows device 1760 with a hook-like tip 1768. Tip 1768 is similar to bent pointed geometry 908 in FIG. 9. The various shapes for the tips are designed with the intention of creating a surface that will contact the body to apply pressure to various muscle groups. As with FIGS. 16A-16C, the examples depicted in FIGS. 17A-17D are just a few examples of simplified designs for a muscle pressure release tool.

Figure 18A:
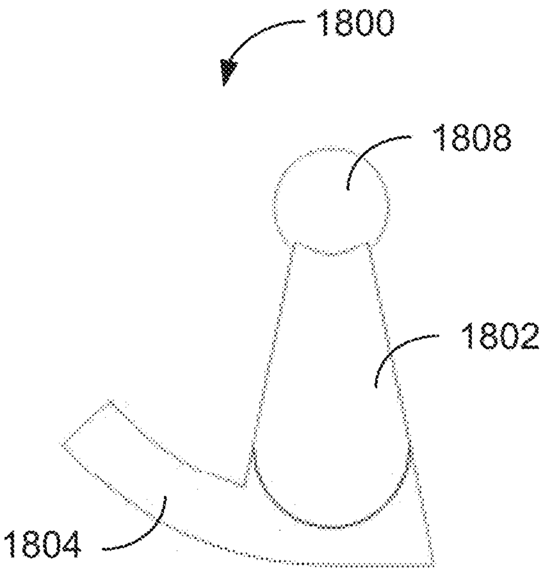
FIGS. 18A-18C illustrate examples of various angles for extended portions of massage devices, in accordance with embodiments of the present disclosure.
Figure 18B:
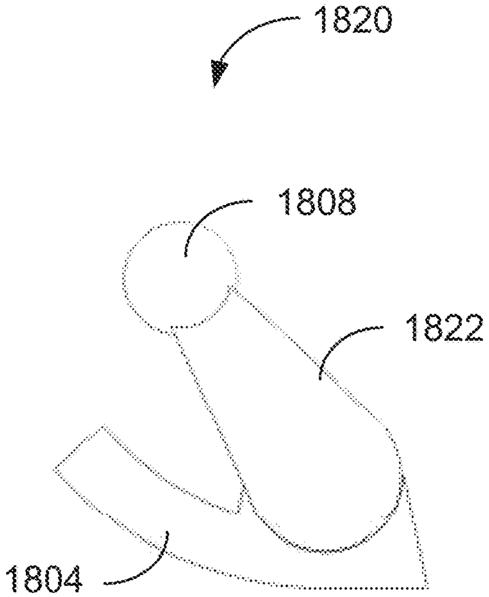
Figure 18C:
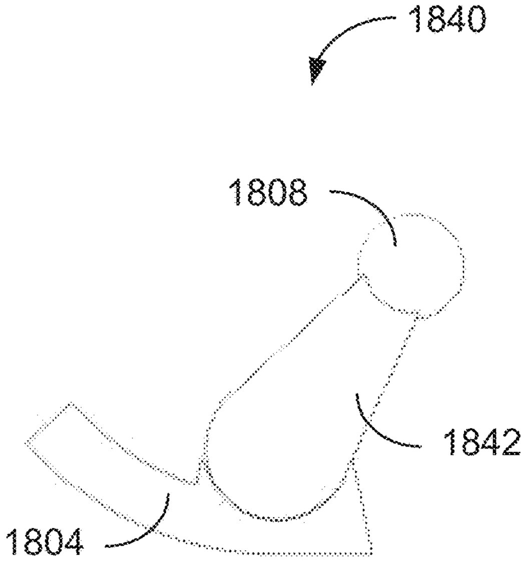

In some embodiments, the angle which the tip is attached relative to the base for a simple design can vary as well. FIGS. 18A-18C illustrate examples of various angles for extended portions of massage devices, in accordance with embodiments of the present disclosure. Each device includes a rounded tip 1808 and a curved base 1804. However, each device demonstrates an example variation of the angle at which the extended portion is attached to the base. For example, FIG. 18A demonstrates device 1800 with an almost perpendicular angle between extension portion 1802 and the bottom of base 1804. FIG. 18B demonstrates device 1830 with a narrower angle between extension portion 1822 and the curved portion of base 1804. FIG. 18C demonstrates device 1840 with a wider angle between extension portion 1842 and the curved portion of base 1804. While the examples illustrated in all the figures above show particular combinations of features/elements of devices, it should be noted that any combination of parts, portions, features, or elements from any combination of the figures can also be mixed and matched to achieve an embodiment in accordance with the present disclosure. These examples are all designed with the function of being able to apply pressure to the muscle by either moving the tool into the body or moving the body on the tool.

The foregoing description of various aspects and examples has been presented for purposes of illustration and description. It is not intended to be exhaustive nor to limit the disclosure to the forms described. The aspects(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A selective pressure application device, comprising:

a tip; and a base having an extended portion coupled to the tip and at least a first portion configured to be planted on a surface when the selective pressure application device is in a resting position, wherein the selective pressure application device is configured to enable a user to lie on top of the tip when the first portion of the base is planted on the surface, wherein the base includes a pivot mechanism, wherein the selective pressure application device is configured to provide angular pressure against a muscle of the user via the tip in response to the user lying on top of the selective pressure application device, wherein the selective pressure application device is configured to rotate around the pivot mechanism to provide the angular pressure to the muscle, wherein, in response to the user lying on top of the selective pressure application device, a movement of the base around the pivot mechanism causes at least the first portion of the base to come off the surface and a second portion of the base not in contact with the surface when the selective application device is in the resting position to contact the surface, and wherein, in response to the movement, the tip is configured to move from a first position with respect to the extended portion of the base to a second position with respect to the extended portion of the base.

2. The device of claim 1, wherein the pivot mechanism is configured to enable the tip to move such that the angular pressure is applied at a plurality of angles and in a plurality of directions.

3. The device of claim 1, wherein the pivot mechanism is rounded in shape.

4. The device of claim 1, wherein the tip is rounded.

5. The device of claim 1, wherein the tip includes a flattened surface at the top.

6. The device of claim 1, wherein the tip is curved.

7. A system, comprising:

a tip; and a base having an extended portion coupled to the tip and at least a first portion configured to be planted on a surface when the selective pressure application device is in a resting position, wherein the selective pressure application device is configured to enable a user to lie directly on top of the tip when the first portion of the base is planted on the surface, wherein the base includes a pivot mechanism, p1 wherein the selective pressure application device is configured to provide angular pressure against a muscle of the user via the tip in response to the user lying on top of the selective pressure application device, wherein the selective pressure application device is configured to rotate around the pivot mechanism to provide the angular pressure to the muscle, wherein, in response to the user lying on top of the selective pressure application device, a movement of the base around the pivot mechanism causes at least the first portion of the base to come off the surface and a second portion of the base not in contact with the surface when the selective application device is in the resting position to contact the surface, and wherein, in response to the movement, the tip is configured to move from a first angle with respect to the extended portion of the base to a second angle with respect to the extended portion of the base.

8. The system of claim 7, wherein the pivot mechanism is configured to enable the tip to move such that the angular pressure is applied at a plurality of angles and in a plurality of directions.

9. The system of claim 7, wherein the pivot mechanism is rounded in shape.

10. The system of claim 7, wherein the tip is rounded.

11. The system of claim 7, wherein the tip includes a flattened surface at the top.

12. The system of claim 7, wherein the tip is curved.

13. A method of using a selective pressure application device to relieve muscle tension, the method comprising:

positioning the selective pressure application device on a surface; and leaning on the selective pressure application device, wherein the selective pressure application device comprises:

a tip; and a base having an extended portion coupled to the tip and at least a first portion is configured to be planted on the surface when the selective pressure application device is in a resting position, wherein the selective pressure application device is configured to enable a user to lie on top of the tip when the first portion of the base is planted on the surface, wherein the base includes a pivot mechanism, wherein the selective pressure application device is configured to provide angular pressure against a muscle of the user via the tip in response to the user lying on top of the selective pressure application device, wherein the selective pressure application device is configured to rotate around the pivot mechanism to provide the angular pressure to the muscle, wherein, in response to the user lying on top of the selective pressure application device, a movement of the base around the pivot mechanism causes at least the first portion of the base to come off the surface and a second portion of the base not in contact with the surface when the selective application device is in the resting position to contact the surface, and wherein, in response to the movement, the tip is configured to move from a first position with respect to the extended portion of the base to a second position with respect to the extended portion of the base.

14. The method of claim 13, wherein the pivot mechanism is configured to enable the tip to move such that the angular pressure is applied at a plurality of angles and in a plurality of directions.

15. The method of claim 13, wherein the pivot mechanism is rounded in shape.

16. The method of claim 13, wherein the tip is rounded.

17. The method of claim 13, wherein the tip includes a flattened surface at the top.

* * * * *